(12) United States Patent
Phillips et al.

(10) Patent No.: US 7,136,903 B1
(45) Date of Patent: Nov. 14, 2006

(54) INTERNET-BASED SHARED FILE SERVICE WITH NATIVE PC CLIENT ACCESS AND SEMANTICS AND DISTRIBUTED ACCESS CONTROL

(75) Inventors: Robert S. Phillips, Brookfield, MA (US); Scott H. Davis, Groton, MA (US); Daniel J. Dietterich, Acton, MA (US); Scott E. Nyman, Shrewsbury, MA (US); David Porter, Littleton, MA (US)

(73) Assignee: Mangosoft Intellectual Property, Inc., New York, NY (US)

( * ) Notice: Subject to any disclaimer, the term of this patent is extended or adjusted under 35 U.S.C. 154(b) by 607 days.

(21) Appl. No.: 09/704,050

(22) Filed: Nov. 1, 2000

Related U.S. Application Data

(63) Continuation-in-part of application No. 08/754,481, filed on Nov. 22, 1996, now Pat. No. 6,148,377.

(60) Provisional application No. 60/163,008, filed on Nov. 1, 1999.

(51) Int. Cl.
  *G06F 15/16* (2006.01)
  *G06F 15/167* (2006.01)
  *G06F 7/00* (2006.01)
  *H04L 9/00* (2006.01)

(52) U.S. Cl. .................. 709/217; 709/213; 709/203; 707/10; 380/30

(58) Field of Classification Search ............... 709/203, 709/213, 219, 245, 217; 707/10, 201; 380/30
See application file for complete search history.

(56) References Cited

U.S. PATENT DOCUMENTS 4,096,567 A    6/1978    Millard et al.
4,426,688 A    1/1984    Moxley
4,710,926 A    12/1987   Brown et al.
4,868,738 A    9/1989    Kish et al.
4,914,571 A    4/1990    Baratz et al.
4,934,764 A    6/1990    Leitermann et al.
5,055,999 A    10/1991   Frank et al.

(Continued)

FOREIGN PATENT DOCUMENTS

EP    0 288 636 A2    11/1988

(Continued)

OTHER PUBLICATIONS

Slein et al., "RFC 2291", Feb. 1998.*

(Continued)

*Primary Examiner*—Wen-Tai Lin
(74) *Attorney, Agent, or Firm*—Proskauer Rose LLP

(57) ABSTRACT

A multi-user file storage service and system enable each user of a pre-subscribed user group to communicate with a remote file server node via a wide area network and to access the files of the file group via the respective client node. More than one user of the pre-subscribed user group is permitted to access the file group at the remote file server node simultaneously. Integrity of the files at the remote file server node are maintained by controlling each access to each file at the remote file server node so that each access to files at the remote file server is performed, if at all, on a respective portion of each file as most recently updated at the remote file server node. Additionally, an encrypted key is transferred from the file server node to a particular client node via a secure channel. The encrypted key uses an encryption function and a decryption function not known locally at the remote file server. Furthermore, both privileged access control rights and file sharing mode access control to a particular file of the group of files are delegated to one or more distributed nodes other than the remote file server node which provides the data.

68 Claims, 17 Drawing Sheets

U.S. PATENT DOCUMENTS

| | | | |
|---|---|---|---|
| 5,067,071 A | 11/1991 | Schanin et al. | |
| 5,077,736 A | 12/1991 | Dunphy, Jr. et al. | |
| 5,117,350 A | 5/1992 | Parrish et al. | |
| 5,119,481 A | 6/1992 | Frank et al. | |
| 5,136,707 A * | 8/1992 | Block et al. | 707/201 |
| 5,226,039 A | 7/1993 | Frank et al. | |
| 5,237,673 A | 8/1993 | Orbits et al. | |
| 5,245,563 A | 9/1993 | Hauck, Jr. | |
| 5,247,673 A | 9/1993 | Costa et al. | |
| 5,251,308 A | 10/1993 | Frank et al. | |
| 5,269,013 A | 12/1993 | Abramson et al. | |
| 5,274,789 A | 12/1993 | Costa et al. | |
| 5,276,852 A | 1/1994 | Callander et al. | |
| 5,282,201 A | 1/1994 | Frank et al. | |
| 5,297,265 A | 3/1994 | Frank et al. | |
| 5,297,269 A | 3/1994 | Donaldson et al. | |
| 5,303,362 A | 4/1994 | Butts, Jr. et al. | |
| 5,307,506 A | 4/1994 | Colwell et al. | |
| 5,313,647 A | 5/1994 | Kaufman et al. | |
| 5,335,325 A | 8/1994 | Frank et al. | |
| 5,341,483 A | 8/1994 | Frank et al. | |
| 5,390,316 A | 2/1995 | Cramer et al. | |
| 5,390,326 A | 2/1995 | Shah | |
| 5,394,555 A | 2/1995 | Hunter et al. | |
| 5,408,649 A | 4/1995 | Beshears et al. | |
| 5,423,037 A | 6/1995 | Hvasshovd | |
| 5,452,447 A | 9/1995 | Nelson et al. | |
| 5,483,652 A | 1/1996 | Sudama et al. | |
| 5,485,455 A | 1/1996 | Dobbins et al. | |
| 5,490,272 A | 2/1996 | Mathias et al. | |
| 5,493,728 A | 2/1996 | Solton et al. | |
| 5,513,314 A | 4/1996 | Kandasamy et al. | |
| 5,519,855 A | 5/1996 | Neeman et al. | |
| 5,522,045 A | 5/1996 | Sandberg | |
| 5,551,035 A | 8/1996 | Arnold et al. | |
| 5,560,027 A | 9/1996 | Watson et al. | |
| 5,560,029 A | 9/1996 | Papadopoulos | |
| 5,588,147 A | 12/1996 | Neeman et al. | |
| 5,592,625 A | 1/1997 | Sandberg | |
| 5,608,903 A | 3/1997 | Prasad et al. | |
| 5,613,079 A | 3/1997 | Debique | |
| 5,617,537 A | 4/1997 | Yamada et al. | |
| 5,634,004 A | 5/1997 | Gopinath et al. | |
| 5,649,194 A | 7/1997 | Miller et al. | |
| 5,675,787 A | 10/1997 | Miller et al. | |
| 5,687,308 A | 11/1997 | Jardine et al. | |
| 5,689,700 A | 11/1997 | Miller et al. | |
| 5,692,183 A | 11/1997 | Hapner et al. | |
| 5,692,193 A | 11/1997 | Jagannathan et al. | |
| 5,696,900 A | 12/1997 | Nishigaya et al. | |
| 5,701,462 A | 12/1997 | Whitney et al. | |
| 5,727,150 A | 3/1998 | Laudon et al. | |
| 5,727,203 A | 3/1998 | Hapner et al. | |
| 5,758,072 A | 5/1998 | Filepp et al. | |
| 5,758,343 A | 5/1998 | Vigil et al. | |
| 5,768,510 A | 6/1998 | Gish | |
| 5,781,537 A | 7/1998 | Ramaswami et al. | |
| 5,805,785 A | 9/1998 | Dias et al. | |
| 5,805,786 A | 9/1998 | Badovinatz et al. | |
| 5,812,533 A | 9/1998 | Cox et al. | |
| 5,812,751 A | 9/1998 | Ekrot et al. | |
| 5,815,710 A | 9/1998 | Martin et al. | |
| 5,832,514 A | 11/1998 | Norin et al. | |
| 5,838,916 A | 11/1998 | Domenikos et al. | |
| 5,848,419 A | 12/1998 | Hapner et al. | |
| 5,862,346 A * | 1/1999 | Kley et al. | 709/245 |
| 5,864,683 A | 1/1999 | Boebert et al. | |
| 5,889,942 A | 3/1999 | Orenshteyn | |
| 5,918,019 A | 6/1999 | Valencia | |
| 5,933,826 A | 8/1999 | Ferguson et al. | |
| 5,956,406 A * | 9/1999 | Maldy | 380/30 |
| 5,966,715 A * | 10/1999 | Sweeney et al. | 707/203 |
| 5,987,506 A * | 11/1999 | Carter et al. | 709/213 |
| 6,026,474 A | 2/2000 | Carter et al. | |
| 6,115,549 A | 9/2000 | Janis et al. | |
| 6,148,377 A | 11/2000 | Carter et al. | |
| 6,430,563 B1 * | 8/2002 | Fritz et al. | 707/10 |
| 6,578,069 B1 * | 6/2003 | Hopmann et al. | 709/203 |
| 6,629,127 B1 * | 9/2003 | Deen et al. | 709/203 |
| 6,714,968 B1 * | 3/2004 | Prust | 709/219 |
| 2002/0133491 A1 * | 9/2002 | Sim et al. | 707/10 |
| 2002/0133494 A1 | 9/2002 | Goedken | |

FOREIGN PATENT DOCUMENTS

| | | |
|---|---|---|
| EP | 0 661 651 A1 | 7/1995 |
| GB | 2 257 273 A | 1/1993 |
| WO | 95/02307 | 1/1995 |
| WO | 95/14279 | 5/1995 |
| WO | 95/22111 | 8/1995 |
| WO | 95/25306 | 9/1995 |
| WO | 96/23268 | 8/1996 |
| WO | 96/30847 | 10/1996 |

OTHER PUBLICATIONS

"An Argument for Simple COMA," Ashely Saulsbury et al., *Proceedings of the First Annual Symposium on High Performance Computer Architecture*, Jan. 1995, pp. 276-285.

"Design of the Trucluster Multicomputer System for the Digital UNIX Environment," Wayne M. Cardoza et al., *Digital Technical Journal*, vol. 8, No. 1 (1996) pp. 5-17.

"Java Dynamic Class Loader," IBM Technical Disclosure Bulletin, vol. 39, No. 11, Nov. 1996, pp. 107-108.

"SiCO: A Simple COMA Implementation," Ashely Saulsbury et al., Swedish Institute of computer Science Technical report, undated.

"Software Agents," Genesereth et al., Communications of the ACM, Jul. 1994, vol. 37, No. 7, pp. 48-53.

"Support for Collaborative Design: Agents and Emergence, Edmonds et al.," Communications of the ACM, Jul. 1994, vol. 37, No. 7, pp. 41-47.

"Synapse Tightly Coupled Multiprocessors: A New Approach to Solve Old Problems," Steven J. Frank et al., *AFIPS National Computer Conference Proceedings*, Jul. 1984, pp. 41-50.

"The KSR1: Bringing the Gap Between Shared Memory and MPP's," Steven J. Frank et al., *IEEE Digest of Papers—Compcon '93*, Feb. 1993, pp. 285-294.

"Tightly Coupled Multiprocessors System Speeds Memory-Access Times," Steven J. Frank et al., *Electronics*, vol. 57, No. 1, Jan. 12, 1984, pp. 164-169.

Amaral et al., "A Model for Persisten Shared Memory Addressing in Distributed Systems," *Object Orientation in Operating Systems*, 1992, IEEE, pp. 2-11.

Anderson et al. "Scheduler Activations: Effective Kernel Support for the User-Level Management of Parallelism," *Operating Systems Review(SIGOPS)*, vol. 25, No. 1, Jan. 1, 1991, pp. 95-109.

Anderson, T., et al. "Serverless Network File Systems," Operating Systems Review (SIGOPS), vol. 29, No. 5, Dec. 1, 1995, pp. 109-126.

Barton—Davis et al. "Adding Scheduler Activations to Mach 3," *Proceedings of The USENIX Mach III Symposium*, Santa FE, NM, USA, Apr. 19-21, 1993, pp. 119-136.

Carter, J., et al. "PPFS: A High Performance Portable Parallel File System," Proceeding of the International Conference on Supercomputing, Barcelona, Jul. 3-7, 1995, pp. 385-394.

Carter, J.B. et al., "Distributed Operating Systems Based on a Protected Global Virtual Address Space," In the Proceedings of the Third Workshop on Workstation Operating Systems (WWOS) (May 1992).

Carter, J.B. et al., "FLEX: A Tool for Building Efficient and Flexible Systems." In the Proceedings of the Fourth Workshop on Workstation Operating Systems (WWOS) (Oct. 1993).

Carter, J.B. et al., "Optimistic Implementation of the Bulk Data Transfer Protocols," *In Proceedings of the 1989 Signetrics Conference*, pp. 61-69 (May 1998).

Carter, J.B., Design of the Munin Distributed Shared Memory System, To appear in the special issue of the *Journal of Parallel an Distributed Computing* on distributed shared memory (1995).

Carter, J.B., et al., "Reducing Consistency Traffic and Cache Misses in the Avalanche Multiprocessor," University of Utah technical report.

Carter, J.B., et al., "Techniques for Reducing Consistency—Related Communication in Distributed Shared Memory Systems," *ACM Transactions on Computer Systems*, pp. 205-243, vol. 13, No. 3 (Aug. 1995).

Dryden, P. "Users throwing cache at networks delays" Computerworld, Oct. 7, 1996, http://www.computerworld.com/search/AT-html/9610/961007SL41cacheb.html, originally printed on May 22, 1997, reprinted on Nov. 18, 1998.

Enterprise Networking Web Page, http://www.lancache.com/enad1.html, printed on May 20, 1997.

Henskens et al. "Course and Fine Grain Objects in a Distributed Persistent Store," *Object Orientation in Operating Systems*, 1993, IEEE, pp. 116-123.

Irelenbusch et al. "Towards a Resilient Shared Memory Concept for Distributed Persistent Object Systems," *Proceedings of the $28_{th}$ Annual Hawaii Intl. conference on System Science*, 1995, IEEE, pp. 675-684.

Koppe C. "Sleeping Threads: A Kernel Mechanism for Support of Efficient User Level Threads," *Proceedings of Seventh IASTED—ISMM International Conference on Parallel and Distributed Computing and Systems*, Washington, DC, USA, Oct. 19-21, 1995, pp. 11-15.

Lea et al. "COOL: System Support for Distributed Programming," *Communications of the ACM*, vol. 36, No. 9, pp. 37-46.

Lee, E., et al. "Petal: Distributed Virtual Disks," $7_{th}$ International Conference on Architectural Support for Programming Languages and Operation Systems, Cambridge, MA, Oct. 1-5, 1996, pp. 84-92.

Li, Kai, "Shared Virtual Memory on Loosely Coupled Multiprocessors," Yale University, Department of Computer Science, (Sep. 1986).

Measurement Techniques Inc. Web Page, http://www.lancache.com/pr1_4.html, printed on May 20, 1997.

Measurement Techniques Inc. Web Page, http://www/lancache.com/slc,html, printed on May 20, 1997.

Neal, D. "The Harvest Object Cache in New Zealand," Computer Networks and ISDN Systems, vol. 11, No. 28, May 1996, pp. 1415-1430.

Network Appliance, Inc. Web Page, http://www.netapp.com/news/level3b/news_rel_970421.html, printed on May 22, 1997.

Network Appliance, Inc. Web Page, http://www.netapp.com/products/level3/netcache/datasheet.html, printed on May 22, 1997.

Network Appliance, Inc. Web Page, http://www.netapp.com/products/level3/webfiler.html, printed on May 22, 1997.

Network Appliance, Inc. Web Page, http://netapp.com/products/level3/nfs.html, printed on May 22, 1997.

Network Appliance, Inc. Web Page, http://www.netapp.com/products/level3/ontap.html, printed on May 22, 1997.

Ng, T. "The Design and Implementation of a Reliable Distribution Operating System—ROSE," Proceedings of the Symposium on Reliable Distributed Systems, Huntsville, Oct. 9-11, 1990, pp. 2-11.

Patent Cooperation Treaty International Search Report, International Application No. PCT/US 97/21457, mailed on Apr. 23, 1998, 4 pages.

Patent Cooperation Treaty International Search Report, International Application No. PCT/US 97/21733, mailed on Apr. 23, 1998, 3 pages.

Patent Cooperation Treaty International Search Report, International Application No. PCT/US 97/21734, mailed on Apr. 23, 1998, 4 pages.

Patent Cooperation Treaty, International Search Report, International Application No. PCT/US 97/21458, mailed on Apr. 23, 1998, 3 pages.

Patent Cooperation Treaty, International Search Report, International Application No. PCT/US 97/21459, mailed on Apr. 23, 1998, 4 pages.

Patent Cooperation Treaty, Interantional Search Report, International Application No. PCT/US 97/21460, mailed on Apr. 23, 1998, 5 pages.

Patent Cooperation Treaty, International Search Report, International Application No. PCT/US 97/21466, mailed on Apr. 23, 1998, 3 pages.

Peak Technologies, Inc. Web Page, http://www.peakJet/PeakJet.html, printed on May 20, 1997.

Peak Technologies, Inc. Web Page, http://www.peak—media.com/PeakJet/quick.html, printed on May 20, 1997.

Raghavan, G. "A Domain Model of WWW Browers," Proceeding of Southeastcon, Bringing Together Education, Science and Technology, Tampa, Apr. 11-14, 1996, pp. 436-439.

Relay Web Page, http://www.relay.com/product/gold.htnl, printed on May 22, 1997.

Relay Web Page, http://www.relay.com/product/otg.html, printed on May 22, 1997.

Sequel Technology Web Page, http://www.sequeltech.com/product/netPIM/prodinfo.html, printed on May 22, 1997.

Stac, Inc. Web Page, http://www.stac.com/news/pressrel/pr-legatoagreement.html, printed on Jun. 13, 1998.

Tricord Systems, Inc. Web page, http://www.tricord.com/2/10/10-3-96.html, printed on May 22, 1997.

Wilson, Andrew W., "Hierachical Cache/Bus Architecture for Shared Memory Multiprocessors," *ACM*, pp. 224-252 (1987).

Wilson, Andrew W., "Organization and Statistical Simulation of Hierarchical Multiprocessors," UMI Dissertation Information Service (1985).

Yeung, D., et al. "MGS" A Multigrain Shared Memory System, Computer Architecture News, vol. 24, No. 2, May 1, 1996, pp. 44-45.

mod_dav: a DAV module for Apache, web page, http://www.webdav.org/mod_dav/mod_dav-1.0.3-1.3.6, printed on Apr. 12, 2005.

Goland et al. "RFC 2518", Feb. 1999.

* cited by examiner

FIG. 11

|  | C1 | C2 | C3 | C4 | C5 |
|---|---|---|---|---|---|
|  | FILE UNCHANGED | FILE CHANGED | FILE RENAMED OR MOVED | FILE DELETED | FILE'S DIRECTORY DELETED |
| R1 — FILE UNCHANGED | NO ACTION | INVALIDATE LOCAL FILE | RENAME OR MOVE LOCALLY CACHED FILE | DELETE LOCALLY CACHED FILE | DELETE LOCALLY CACHED FILE |
| R2 — FILE CHANGED | UPLOAD CLIENT FILE | MOVE CLIENT FILE TO THE CONFLICT BIN & INVALIDATE LOCAL FILE | MOVE CLIENT FILE TO THE CONFLICT BIN & UPLOAD IT | MOVE CLIENT FILE TO THE CONFLICT BIN & UPLOAD IT | MOVE CLIENT FILE TO THE CONFLICT BIN & UPLOAD IT |
| R3 — FILE RENAMED OR MOVED | RENAME OR MOVE FILE AT SERVER | MOVE SERVER FILE TO THE CONFLICT BIN | PUT WARNING IN CONFLICT BIN (UNLESS IDENTICAL RENAME/MOVE) | MOVE FILE TO THE CONFLICT BIN & UPLOAD FILE | MOVE CLIENT FILE TO THE CONFLICT BIN & UPLOAD IT |
| R4 — FILE DELETED | DELETE FILE AT SERVER | MOVE SERVER FILE TO THE CONFLICT BIN | IGNORE DELETE; PUT WARNING IN CONFLICT BIN | NO ACTION | NO ACTION |
| R5 — FILE'S DIRECTORY DELETED | DELETE FILE AT SERVER | MOVE SERVER FILE TO THE CONFLICT BIN | MOVE SERVER FILE TO THE CONFLICT BIN & DOWNLOAD IT | NO ACTION | NO ACTION |

FIG. 12

|  | C1' DIRECTORY UNCHANGED | C2' DIRECTORY ATTRIBUTE CHANGED | C3' ADDED CHILD FILE OR DIRECTORY | C4' DIRECTORY RENAMED OR MOVED | C5' DIRECTORY DELETED |
|---|---|---|---|---|---|
| R1' DIRECTORY UNCHANGED | NO ACTION | DOWNLOAD CHANGED ATTRIBUTE | DOWNLOAD NEW DIR ENTRY | RENAME OR MOVE LOCALLY CACHED DIRECTORY | DELETE LOCALLY CACHED DIRECTORY |
| R2' DIRECTORY ATTRIBUTE CHANGED | UPLOAD CHANGED ATTRIBUTE | PUT WARNING IN CONFLICT BIN AND KEEP SERVER ATTRIBUTE OR LATER TIMESTAMP | DOWNLOAD NEW DIR ENTRY | RENAME OR MOVE LOCALLLY CACHED DIRECTORY; UPLOAD CHANGE | DELETE LOCALLY CACHED DIRECTORY |
| R3' ADDED CHILD FILE OR DIRECTORY | UPLOAD NEW DIR ENTRY | IF COMPATIBLE, UPLOAD DIR ENTRY & DOWNLOAD ATTR CHANGE. ELSE MOVE NEW LOCAL ENTRY TO CONFLICT BIN | IF COMPATIBLE, UPLOAD & DOWNLOAD DIR ENTRY CHANGES. ELSE MOVE NEW LOCAL ENTRY TO CONFLICT BIN | RENAME OR MOVE LOCAL DIRECTORY; UPLOAD NEW DIR ENTRY | MOVE NEW FILE/DIR TO CONFLICT BIN; DELETE LOCAL DIRECTORY |
| R4' DIRECTORY RENAMED OR MOVED | RENAME OR MOVE DIRECTORY AT SERVER | RENAME OR MOVE SERVER DIRECTORY; DOWNLOAD ATTR CHANGE | RENAME OR MOVE DIRECTORY AT SERVER; DOWNLOAD NEW DIR ENTRY | PUT WARNING IN CONFLICT BIN (UNLESS IDENTICAL RENAME/MOVE) | PUT WARNING IN CONFLICT BIN & UPLOAD DIRECTORY |
| R5' DIRECTORY DELETED | DELETE DIRECTORY AT SERVER | DELETE DIRECTORY AT SERVER | MOVE NEW FILE/DIR TO CONFLICT BIN; DELETE DIR AT SERVER | PUT WARNING IN CONFLICT BIN & DOWNLOAD DIRECTORY | NO ACTION |

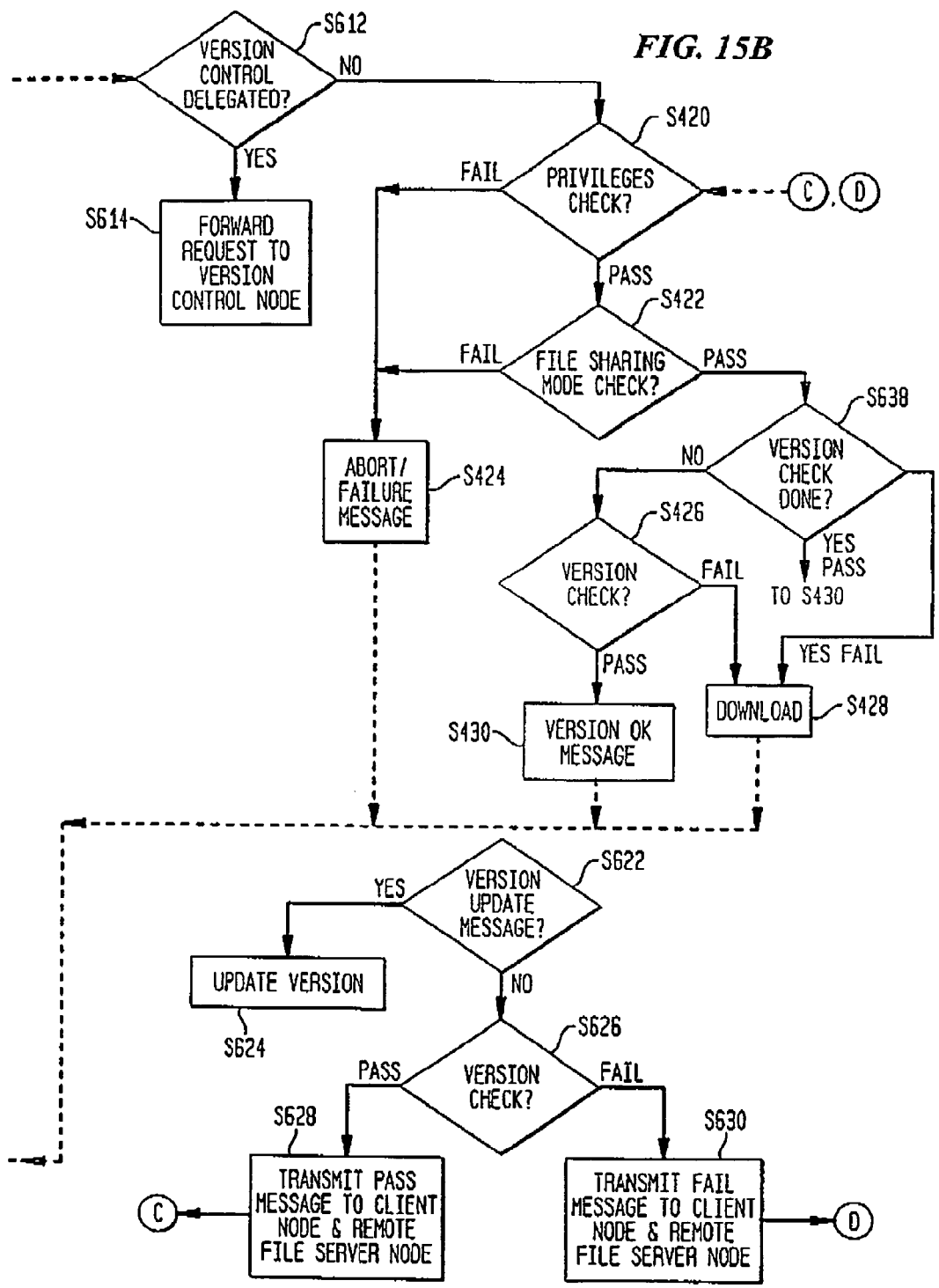

INTERNET-BASED SHARED FILE SERVICE WITH NATIVE PC CLIENT ACCESS AND SEMANTICS AND DISTRIBUTED ACCESS CONTROL

RELATED APPLICATIONS

This application is a continuation-in-part of U.S. patent application Ser. No. 08/754,481, entitled "Shared Memory Computer Networks", filed Nov. 22, 1996 now U.S. Pat. No. 6,148,377 for John B. Carter, Scott H. Davis, William Abraham, Steven J. Frank, Thomas G. Hansen, Daniel J. Dietterich, and David Porter.

This application is based on Provisional Application Ser. No. 60/163,008, entitled "Internet-Based Shared File Service with Native PC Client Access and Semantics", filed Nov. 1, 1999 for Robert S. Phillips, Scott H. Davis, Daniel J. Dietterich, Scott E. Nyman and David Porter. The contents of this provisional application are fully incorporated herein by reference.

This application is related to the following patent applications, which are all commonly assigned to the same assignee hereof:

U.S. patent application Ser. No. 09/703,884, entitled "Internet Based Shared File Service with Native PC Client Access and Semantics," filed on even date herewith for Robert S. Phillips, Scott H. Davis, Daniel J. Ditterich, Scott E. Nyman and David Porter, issued as U.S. Pat. No. 7,508,696, Jun. 6, 2006; and U.S. patent application Ser. No. 09/704,262, entitled "Internet Based Shared File Service with Native PC Client Access and Semantics and Distributed Version Control," filed on even date herewith, now abandoned, for Robert S. Phillips, Scott H. Davis, Daniel J. Dietterich, Scott E. Nyman and David Porter.

The above-listed documents are fully incorporated herein by reference.

FIELD OF THE INVENTION

The present invention pertains to a multi-user shared file access service provided over a wide area network, such as the Internet.

BACKGROUND OF THE INVENTION

A burgeoning need has developed for improved remote computing access. This has arisen in part owing to the continual decrease in the cost of computer technology, in particular, computer terminals. As a result, there is a wide proliferation of computer terminals of various types, including desktops, laptops, game consoles and "Internet receivers." In addition, wide area network access, most notably, Internet access, is commonly available at a variety of geographic locations. For instance, many homes and hotels contain computer terminals and provide Internet access.

The volume of available computer equipment and widespread accessibility of the Internet has increased the desire by users to access data remotely. For instance, many workers are now encouraged to "telecommute, "i.e., to work at home rather than at the enterprise campus. More often than not, the telecommuting user must use a computer terminal in the home to remotely access computing resources (such as data, programs and applications, processing capacity, storage capacity, etc.) outside of the home, e.g., at the enterprise campus. In addition, initiatives are underway to deploy so-called "network computer architectures" comprised of a limited number of high capacity processors which are widely remotely accessible to a multitude of computer terminals possessing more limited computing resources. Furthermore, workers in various arbitrary and remote geographic locations are encouraged to collaborate on projects remotely by exchanging computer data, programs and applications with each other via a wide area network.

It is desirable to provide the same capabilities to users who remotely access computer resources as are available to users connected to a local area network. Specifically, a local area network provides some measures of security against eavesdropping and other unauthorized access as only those with access to the local area network can monitor the data transferred on the local area network. Local area networks enable sharing at two levels. First, groups of users may simultaneously access files in a common storage space. More importantly, users can contemporaneously or simultaneously access the same file. Applications which permit contemporaneous and simultaneous file access amongst multiple users provide "locks," i.e., controls for maintaining the integrity of data. For instance, multiple users are only allowed to access files or portions of files according to compatible access modes. Thus, write access to a file, or a specific portion of a file, is typically exclusive to one user. However, more than one user often may be permitted to simultaneously read a file, or a portion of a file, at the same time. In addition, privilege access rights are typically specifiable for directories and files. Specifically, read, write and delete privileges can be restricted to individual users and groups. For example, one user might be provided read, write and delete rights to an entire directory. An entire user group might have only read and write privileges for all files in a directory, but certain users of that group might have only read privileges for a certain file within that directory. A third user group might have only read privileges for all files in a directory.

Certain products and services are currently available for assisting users to obtain remote access to files. A number of single user Internet services are available for storing information including those marketed under the names "Driveway™," "Idrive™," "FreeDiskSpace™," "FreeBack™," "SwapDrive™, " and "Visto™." These services provide a remote storage device, which the user can access while executing a web browser program on the user's computer terminal, to store data for later retrieval. Most of these services operate according to a so-called "publish/subscribe" schema. According to a publish/subscribe schema, the user must take deliberate actions while executing the web browser program to transfer files from the user's computer terminal to the remote storage device for storage or to retrieve files from the remote storage device to the user's computer terminal. For instance, while executing the browser program, the user uses the pointing to device to select a selectable displayed feature on the display device (i.e., a "button" or "icon") for uploading files. The user then selects a locally stored file for uploading (by locating the file and selecting it). A copy of the file is then transferred via the Internet to the remote storage device where it is stored. A similar sequence of steps can be used to retrieve files from the remote storage device.

These systems have two primary uses. First, a user with a limited amount of storage space can utilize these systems to obtain excess storage space or storage off the user's terminal. Second, multiple users can obtain access to a set of files specifically designated for group access. Note this is not quite the same as "file sharing" whereby multiple users can contemporaneously or simultaneously access the same files.

Rather, all these systems provide is a storage space which can be accessed by multiple users, albeit one at a time. As such, these systems have the following disadvantages:

(a) File sharing, i.e., contemporaneous/simultaneous access to a file, is not supported.

(b) Multiple users are not able to access the same common storage space at the same time, even if they desire to simultaneously access different files in that space.

(c) The publish/subscribe schema requires deliberate user intervention to transfer files between the user's local terminal and the remote storage space. This has several consequences. First, the user must engage in a different set of actions to transfer a file between the remote storage device and the user's local computer terminal than the user normally uses when accessing a file locally resident on the user's computer terminal. As a result, the user must acquire additional skills to access files on the remote storage space.

(d) More importantly, the user must engage in actions to transfer the file from the remote storage device to the user's computer terminal before the file can be accessed at all. Therefore, applications executing on the user's local computer terminal cannot automatically access the files while they are located at the remote storage device. In contrast, when these files are stored locally on the user's computer terminal, an application or program may simply access such files without user intervention in the normal course of execution. Stated another way, certain applications executing at the user's local terminal can freely automatically access files maintained at the local terminal without the need for human intervention. For example, in the course of executing an application, the application may access locally stored data and configuration files, unbeknownst to the user. On the other hand, if one of these data or configuration files is located at the remote storage device at the time the application is executed, the application is incapable of automatically accessing such a remote file. Rather, the user must know which remote files will be needed for access and must take deliberate preliminary actions to download such files to the local terminal prior to the access by the locally executing application.

(e) Limited security is provided to prevent unauthorized eavesdropping on files. Some services only provide security in the form of an account password login. This is typically adequate in a private network, e.g., a local area network or a private wide area network link. However, in the Internet, data is transferred via an arbitrary path and over an indiscernible sequence of private networks under control of other (typically unknown) persons. Some services provide security through secured socket layer transfers (SSL). Amongst other things, SSL provides a manner whereby the server at the service encrypts information immediately before it is transmitted via the Internet to the client node (and vice versa). This tends to thwart unauthorized access by eavesdroppers to the files while in transit over the Internet. The problem with this technique is that the data of the files is often nevertheless stored at the server of the file storage service in unencrypted form. Thus, the files may be subject to unauthorized access by persons obtaining access to the server of the file storage service.

(f) File version control and integrity is not maintained automatically. Some single user systems enable multiple users to access a file albeit, one at a time. That is, user A may access and modify a specific remotely stored file. Subsequently, a second user B may access and modify the same remotely stored file. When user A accesses the modified file again, the file includes the most recent modifications by user B and not the modifications by user A. This requires more effort on the part of users who share access to the files to coordinate their accesses to the files to avoid errors and loss of data.

Note that integrity can also be compromised where multiple users have access to the files simultaneously. Specifically, a mechanism should be provided to prevent each user from accessing the same portion of a file according to an incompatible file sharing access mode. This is described in greater detail below.

Additional single user services are marketed under the names "Storagepoint™" and "X-Drive™." Storagepoint™ provides a Windows™ Explorer™ Name Space extension object. As a result, certain aspects pertaining to user file access are similar for both files which are stored remotely and files which are stored locally. For instance, a user executing the "Windows™" operating system can use the "Explorer™" program to display the list of files stored on the remote storage device in the same fashion as the user would display a list of files stored locally on the user's computer terminal. In addition, the user can transfer files between the remote storage device and the user's computer terminal using similar actions as can be utilized to move files between various local devices of the user's computer terminal, i.e., by "dragging" and "dropping" the icons associated with such files. However, applications and programs executing at the user's computer terminal cannot seamlessly and automatically access files which reside at the remote storage device in the same fashion as such applications or programs would access files stored locally at the user's computer terminal. The reason is that the automatic mechanism for enabling an executing application to locate and automatically download such a file is not provided by such services. Rather, remotely stored files must first be transferred to the user's computer terminal so that the applications and programs can access them during normal execution.

"X-Drive™" provides a more extensive file service for a single user. Like Storagepoint™, X-Drive™ enables the user to transfer files between the remote storage device and the user's computer terminal using the same actions for transferring the files between locally physically present devices of the user's computer terminal (i.e., icon dragging and dropping). However, X-Drive™ also allows applications and programs executing at the user's terminal to seamlessly access files which reside at the remote storage device as such applications or programs would access files stored locally at the user's computer terminal. Specifically, during the course of normal execution of such programs or applications, such files are seamlessly, and automatically transferred from the remote stored device to the user's computer terminal by other software provided by X-Drive™, when such applications or programs attempt to access the remotely stored files. In short, while using X-drive™, the user, applications and programs treat remotely stored files the same way as locally stored files.

Nevertheless, neither Storagepoint™ nor X-Drive™ enable contemporaneous or simultaneous access to files or a group of files by multiple users. Nor do these services maintain the integrity of such files. Storagepoint™ offers server encryption but X-Drive™ does not. Storagepoint™ uses a secured socket layer to transfer encrypted information between the user's computer terminal and the remote file storage device. Once at the remote file storage device, the information is "re-encrypted" prior to storage to prevent against unauthorized access by Storagepoint™ employees. However, the data exists in non-encrypted form at the site of the remote file storage device immediately prior to the pre-storage re-encryption step and immediately before pre-transfer secured socket layer encryption. In short, because the methodology to decrypt the data is available at the remote storage device, the user cannot be assured that security is never compromised.

In addition to the single-user services described above, a number of multi-user services are available, including those marketed under the names "Punch Networks™," and "FreeDrive™." Unlike the single-user systems, these multi-user systems allow multiple users to access the same shared storage space simultaneously. Each of these services uses the publish/subscribe schema for transferring files. Thus, the user must engage in additional steps not performed for files already present at the user's computer terminal in order to access the files that reside at the remote storage device. In addition, programs and applications cannot access such files seamlessly and automatically while such files are resident on the remote storage device. Also, simultaneous access to the same file or portion of a file by multiple users is not supported. Furthermore, while Punch Networks™ encrypts the data, the encryption is performed at the site of the remote file storage device. Again, security can still be compromised by unauthorized access at the site of the remote file storage device.

Punch Networks™ provides a version control system whereby every version of a file (i.e., every updated modification specifically "published," i.e., deliberately uploaded by each user) is maintained. This enables each user in a group to access any specific version of a file and to be assured that any given uploaded version has remained intact between accesses by that specific user. However, this system cannot be assured to provide a single version of a file which is most up-to-date for each of multiple users who modify the file in an interleaved fashion. For instance, suppose that both user A and user B obtains the same copy of a given version of a file. Users A and B both modify their respective copies differently and desire to upload their modified copies for storage. The result will be that two versions of the file will be stored, one for user A and one for user B, each being a different version. A third user C, will now be required to pick amongst these two versions.

Other Internet services, including "Eroom™," "Change-Point," "X-Collaborate™," eGroups™," "eCircles™," "vJungle™," "Hot Office™," and "HotBiz™," provide personal remote storage space. Some of these services provide for file sharing under the publish/subscribe schema. In addition, some of the services provide rudimentary document control. Each of these systems has the same problems already noted above.

In short, none of the wide area network services available provide for remote file access which maintains the integrity of files by ensuring that each access to a file at the remote file server is to the most up-to-date copy of the file. Nor do these services enable contemporaneous and simultaneous access by multiple users to the same files. Furthermore, these services do not provide adequate encryption according to which the manner of encrypting the files is not known at the remote storage device.

It is an object of the invention to overcome the disadvantages of the prior art.

SUMMARY OF THE INVENTION

This and other objects are achieved according to the invention which provides a multi-user file storage service and system. Each user of a user group of one or more users is enabled to operate an arbitrary client node at an arbitrary geographic location to communicate with a remote file server node via a wide area network. Each user of the user group is enabled to access the files of the file group via the respective client node in communication with the remote file server node via the wide area network. More than one user of user group is permitted to access the file group at the remote file server node simultaneously.

According to one embodiment, the integrity of the files at the remote file server node are maintained by controlling each access to each of the files at the remote file server node so that each access to one of the files at the remote file server is performed, if at all, on a respective portion of each of the one files as most recently updated at the remote file server node. This enables all native operating system application programming interfaces to operate so that all multi-user applications accessing the files function as if the remote server, which stores the files, and client nodes, at which such multi-user applications execute, were on the same local area network.

According to another embodiment, an interface is provided for adapting file access at a first one of the client nodes. The interface designates at the first client node each of the one or more accessible files of the file group as stored on a virtual storage device. The interface also enables access to the designated files in a fashion which is indistinguishable, by users of, and applications executing at, the first client node, with access to one or more files stored on a physical storage device that is locally present at the first client node.

According to yet another embodiment, an encrypted key is transferred from the remote file server node to a first one of the client nodes via a secure channel. The key is encrypted using an encryption function not known locally at the remote file server node. The transferred key is decrypted at the first client node. The key is used at the first client node to decrypt information of the files downloaded from the remote file server node or to encrypt information of the files prior to uploading for storage at the remote file server node.

According to a further embodiment, a manger node which chooses which users may join the group, transmits a message to an Internet email address of a user inviting the user to join the user group. Using the information in the message, a client node operated by the user issues a message to join the user group. The message is usable only once to join the user group.

Illustratively, when a communication is first established between a particular client node and the remote server node, a connection between the particular client node and the remote file server node is authenticated. Specifically, the particular client node verifies the identity of the remote server node, and the remote server node verifies the identity of the user of the particular client node.

In addition, the particular client node illustratively encrypts data of a file using an encryption methodology known to the client node but not known to the remote file server node. The client node then uploads the encrypted data to the remote file server node. Thus, the remote file server node stores the encrypted file data.

Likewise, the remote file server node illustratively retrieves from storage the encrypted data of a particular file and transmits the encrypted data to a specific client node.

Using a decryption methodology known to the specific client node but not known at the remote file server node, the client node decrypts the data.

Illustratively, when the remote file server node receives a request from a specific client node to access a particular file, the remote file server node determines whether or not the particular access requested by the specific client node is permitted by privilege access rights associated with the particular file. The remote file server node only permits the access to the particular file by the specific client node if permitted by the privilege access rights associated with the particular file.

According to a further embodiment of the invention, access control to a particular one of the files of the group of files is delegated to an access control node.

According to yet a further embodiment of the invention, version control of a particular one of the files is delegated to a version control node.

BRIEF DESCRIPTION OF THE DRAWING

FIGS. 11-12 show tables illustrating a reconciliation process according to an embodiment of the present invention.

FIGS. 15A and 15B show a flowchart illustrating distributed version control according to an embodiment of the present invention.

DETAILED DESCRIPTION OF THE INVENTION

Wide Area Network Architecture

Figure 1:
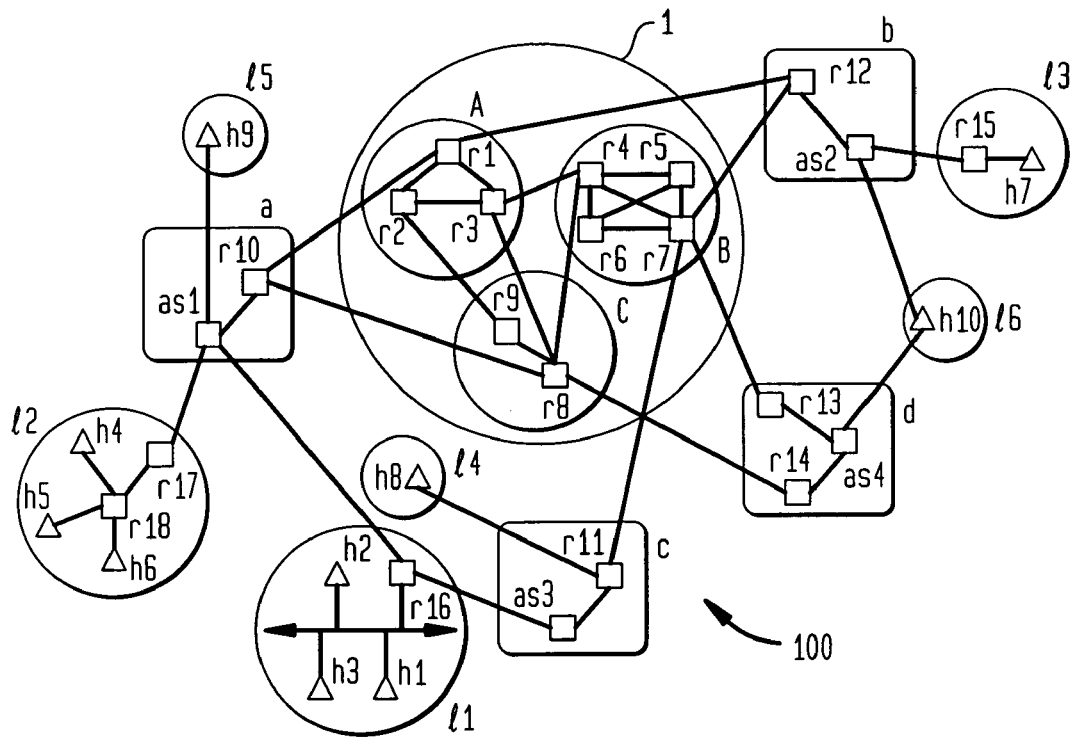
FIG. 1 shows an illustrative network in which an embodiment of the present invention is intended to be used.

FIG. 1 shows a wide area network 100 such as the Internet. This network is composed of local networks 11–16, access networks a–d and backbone networks A–C forming backbone 1. Devices r1–r18 denote switches or routers, devices h1–h10 denote computer terminals, and devices as1–as4 denote access servers. Computer terminals typically originate and terminate communications and messages, whereas switches, routers and access servers typically merely route messages and communications to another device in transferring such messages or communications to their intended destinations. Access servers also control access of messages and communications from the networks 11–16 to the rest of the wide area network 100.

Generally stated, the Internet 100 is an interconnection of a plurality of private networks maintained by network access providers (NAPs) and Internet service providers (ISP), who operate the access networks a–d. The interconnection of the access networks may be carried by various high capacity (i.e., T1, T3, T4, OC-3, OC-48, etc.) privately leased lines of the telephone network, e.g., backbone networks A–C. Communication is achieved in the Internet using a hierarchy of protocols, including the Internet protocol (IP), the transmission control protocol (TCP), the file transfer protocol (ftp), the hypertext transfer protocol (http) and the hypertext transfer protocol over secured sockets layer (https). Amongst other things, the Internet 100 can carry (in packets) messages for requesting information, and such requested information, from a source device to an appropriate destination device. As the construction and operation of the Internet is conventional, its details are not described further.

Node Architecture

Figure 2:
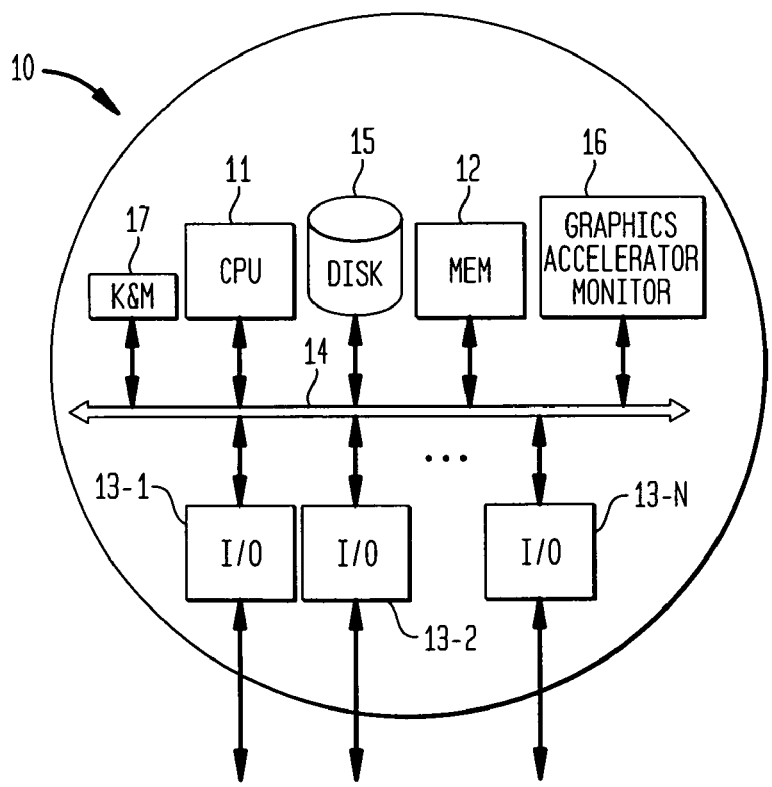
FIG. 2 shows an illustrative computer terminal or remote file server of the network of FIG. 1.

FIG. 2 depicts a typical node in the form of a computer terminal 10. The computer terminal 10 typically includes a processor 11 or CPU, memory 12, one or more I/O devices 13-1, 13-2, . . . , 13-N (e.g., modems, cable modems, network interface cards, etc.), disk 15 (fixed magnetic, removable magnetic, optical, etc.), graphics accelerator and display monitor 16 and keyboard and mouse 17. Each of these devices is connected via one or more busses 14. An illustrative example of the computer terminal 10 is a "PC" compatible computer capable of executing the Windows NT™ operating system distributed by Microsoft Corp.™, a company located in Redmond, Wash. A similar architecture can be used for routers and access servers by substituting disks 15, memories 12, I/O devices 13-1 to 13-N and processors 11 of appropriate sizes, number and/or capacity. In addition, the keyboard and mouse 17 and/or the graphics accelerator and monitor 16 can be omitted. The memory 12 can include both a large main memory, e.g., implemented with SDRAM circuits and a smaller cache memory, e.g., implemented with SRAM circuits.

Herein, the invention is illustrated using PC computers, such as desktops, laptops and file servers, as nodes. However, the invention is also applicable for other types of nodes such as game consoles and Internet receivers. Such devices have different mechanisms for enabling user input. Illustratively, the nodes will be presumed to include "pointer devices" implemented using an input device, such as a mouse, track pad, joy stick, track ball, stylus, etc. and suitable software which responds to the manual input device. The invention is illustrated using a pointer device designed to work with the Windows NT™ operating system. Such a pointer device accepts user input regarding direction and selection and supports the well known user operations of "selecting," "dragging," "clicking on," "double-clicking on," etc. graphical representations of files, devices, etc. to activate access or otherwise use them. In addition, the invention is illustrated herein for the Internet as the wide area network, but of course is applicable to other wide area networks.

Herein, the following nomenclature is used. "Client node" describes a device such as a computer terminal h1–h8, adapted according to the invention for purposes of enabling access to files stored locally in the memory 12 or disk 15 of the client node or remotely as described herein. "Remote file server node" describes an apparatus, such as a file server computer h9–h10, including a storage device, such as one or more disk drives 15, memory circuits 12, etc., adapted according to the invention to enable multiple simultaneous client node access to groups of files.

Overview of General Architecture and Principles

As a general principle according to an embodiment of this invention, one or more remote file server nodes, e.g., nodes h9–h10, which can be implemented using Proliant 6400™ servers distributed by Compaq™ a company located in Houston, Tex., have a large disk storage capacity, e.g., implemented using EMC Symetrix SANs™, distributed by EMC Corp.™, a company located in Hopkinson, Mass. This disk storage capacity is allocated for storing a group of one or more files as if on a single virtual storage device or virtual drive. A group of users is enabled to access the group of files on such a virtual storage device by accessing data in local caches and interaction between the remote file servers nodes h9–h10 and geographically remote client nodes h1–h8 operated by the users. The remote file server nodes effectively provide a consistent and persistent "home" at which a master copy of each file of the group is persistently maintained. The remote file server nodes h9–h10 enable access to the files in a shared fashion-multiple client nodes operated by users can simultaneously access the files of the group stored on the virtual storage device. Given that the copies of the files on the remote file server nodes serve as a master or true source copy, the accesses to the copies of the files at the remote file server nodes illustratively are performed in a fashion described below which maintains the integrity of these master copies of the files at the remote file server nodes.

In addition, an interface is provided on each client node which "hides" the geographic remoteness of the origin of the files from both the users of the client nodes and applications executing on the client nodes. The files "appear," i.e., entirely behave, and can be accessed using pre-existing programs and applications, as if locally present on the client nodes. Any file or directory information transfer and integrity maintenance is performed transparently to the user and applications which otherwise function, most notably, access the files, as if they were locally present.

Furthermore, security is provided in several forms. First, consider that the client nodes and remote file server nodes are geographically remote and may be operated by different organizations. A manner is provide for each of the client nodes and the remote file server nodes to authenticate each other prior to communicating sensitive information. Second, a secure channel is provided to enable transfer of file data over the Internet, which otherwise is inherently insecure.

The users illustratively can access the files while operating client nodes on a local area network, such as the client node h4 on the local area network 12. Illustratively, the same user can access the files using portable client nodes, such as laptops. For example, client node h8 illustratively represents a mobile client node that can connect to a remote file server node h9 or h10 via any available communication channel to the Internet 100, e.g., a land-line telephone dial up channel or wireless channel.

Illustratively, the remote file server nodes can implement several virtual storage devices. For example, a group F1 of one or more virtual storage devices can be provided for a single group of users G1. A group F2 of one or more additional virtual storage devices can be provided for an entirely contained subset of users of that group G2 G1. Yet another group F3 of one or more additional virtual storage device can be provided entirely for a distinct group of users G3, where G3nG1={ }. It is also possible for one specific user g1 to be part of two different groups, say G1 and G4, where G1? G4, where the users of G1 can access the file group F1 and where the users of G4 can access the file group F4 of another virtual storage device provided by the remote file server nodes. Illustratively, user g1 can freely transparently and simultaneously access the files of groups G1 and G4 in an arbitrary fashion.

One remote file server node may contain all of the files of a given group G1 and provide all of the file access functions described below for that group. In an alternative embodiment, the storage of the files of a group are divided amongst multiple remote file server nodes which may be in close geographic proximity to one another or which may be geographically remote from one another. According to another embodiment, the client nodes can access one or more files via each of multiple remote file server nodes. Illustratively, the specific remote file server node believed to perform a file access most efficiently is chosen for a file access operation by a given client node. For example, according to a load balancing schema, multiple remote file server nodes are provided as a bank. The remote file server node which is least "busy" servicing other file accesses is allocated to the next incoming client node file access. According to another schema, the remote file server node which is "closest" in terms of having the highest end-to-end throughput to the client node is chosen, etc.

Client Node—Remote Node Software Architecture

Figure 3:
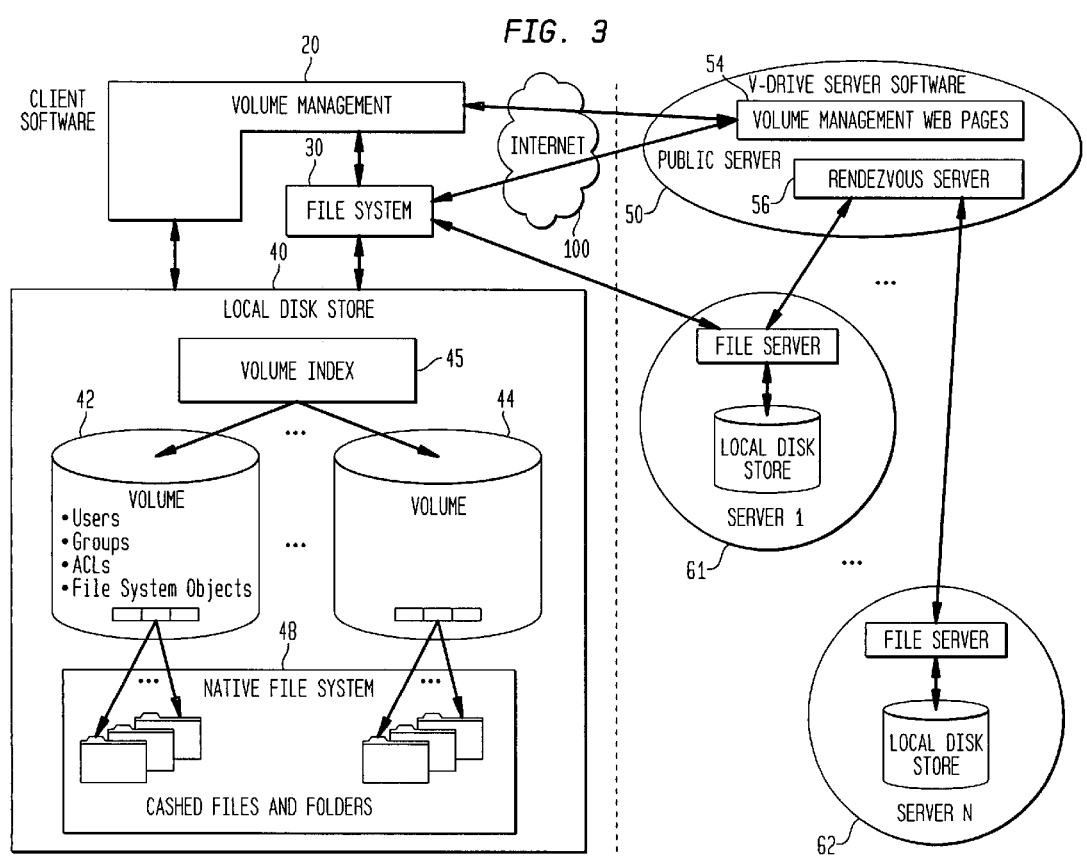
FIG. 3 shows an illustrative architecture according to an embodiment of the present invention.

FIG. 3 shows a typical architecture for implementing the invention. The functional blocks "Volume Management" 20 and "File System" 30 can be implemented by suitable software executing on the processor 11 of a client node. The "Local Disk Store" 40 is a software subsystem executed by the processor 11 of the client node which manages storage of information on the local disk of the client node. The division of the client node software in this fashion is merely illustrative.

Each "volume" 42, 44 figuratively represent a different virtual storage device which is accessible to the client node. Two different virtual storage devices are shown for sake of illustration although the exact number will vary. In fact, the precise number accessible on a given client node will depend on the particular user who is using the client node at that moment. These storage devices are "virtual" in that they are presented to the user and applications by the operating system as if they were actual physical devices. However, in fact, as described below, they are constituted by an elaborate scheme of local "cache" storage of selected file data and directory information on an actual physical storage device (e.g., disk 15) of the client node and secured connection communication by the client node (e.g., using the I/O device 13-1) with the remote file server node to obtain missing file data and directory information and to ensure the integrity of the master copy of such information at the remote file server node. A volume index 45 assists in identifying file data and directory information stored on the virtual storage devices 42, 44.

In the configuration shown in FIG. 3, the remote file servers are actually shown as organized into a "public server" 50 and "file servers" 61, 62, . . . although this organization is merely illustrative. The public server 50 is provided as a point of first contact for the client nodes, whereas the file servers 61, 62, . . . actually perform the file access and integrity maintenance functions. More specifically, the public server 50 is initially contacted by the client nodes when a user desires to join a particular virtual storage device. In addition, the public server 50 can redirect each client node to the correct or most efficient file server 61, 62, . . . for providing the file access and integrity maintenance features described below. The public server 50 is shown as including a component labeled "volume management web pages" 54 and a component labeled rendezvous server" 56. Both the public server 50 and the file servers 61, 62, . . . are implemented by suitable software executing on the processor 11 of each remote file server node. Given that the specific division of functions of a remote file server node is arbitrary, below, the term remote file server node will be used for sake of generality, without reference to specific components to which each function has been allocated in a given configuration.

The client software may be deployed at one, all or some of the computer terminals on a local area network, such as the host computer terminals h4, h5 and h6 on subnetwork 12 of FIG. 1. Also, the client software can be deployed on moveable computer terminals (such as laptops) and or computer terminals at multiple different geographic locations, e.g., host computer terminal h8. For generic users, the client software/client node is capable of performing the following functions:

(a) Locating remote file server nodes on the wide area network: As noted above, the client nodes access one or more virtual storage devices 42, 44 identified as distinct units without regard as to where such virtual storage devices are located or as to precisely on which group of one or more remote file servers implement such virtual storage devices. As one skilled in the art may appreciate, a file server can provide file access for (actually store, retrieve or modify the data of) an entire single virtual storage device, multiple virtual storage devices, parts of such virtual storage devices or combinations thereof. Furthermore, it is sometimes desirable to maintain mirror copies of data for sake of robustness (i.e., to have a backup remote file server node in the event one file server is disabled), ease of maintenance, or traffic control. In any event, the client software transparently accesses locally stored information, such as URLs, for determining how to send commands, data or other information to the appropriate remote file server node providing the functionality of a virtual storage device to be accessed;

(b) Initiating first time subscription of each user to a given virtual storage device, including generating encryption keys for subsequent file accesses, as described in greater detail below, and requests to remove a the user from the group of users who may access a given virtual storage device;

(c) Requesting information about other users of any virtual storage device provided by a service according to the invention;

(d) Transparently encrypting information prior to uploading to the remote file server for storage and decrypting information downloaded from the remote file server prior to use, as described in greater detail below;

(e) Intelligently transparently caching accessed file data at the client node which have been opened by the client user;

(f) Maintaining the integrity of file data access at this client node: This includes, if possible, performing version checks on file data prior to accessing it and obtaining the most up-to-date copy of accessed file data prior to access. Such version checks may be performed at the file level or on individual portions of a given file. This is described in detail in U.S. Pat. No. 5,918,229 and U.S. patent application Ser. No. 08/754,481, both assigned to MangoSoft Corp. and are fully incorporated herein by reference. In addition, the client node software recognizes and resolves conflicts in file data this client node modified while disconnected from the remote file server vis-à-vis file data modified at the remote file server node (by another client node) while this client node was disconnected from the remote file server node. The client software also maintains separate storage for file data and directory information, which cannot be reconciled with the remote file server node and other integrity warning messages. This is described in greater detail below; and (g) Downloading the file data from any arbitrary point in a file for convenience or efficiency. For example, the client user may only require a small data portion of the entire file. In addition, an interrupted download may be restarted at the point where communication between client node and the server node terminated.

In addition, at least one client node is provided with client manager software, which enables this node to function as the client manager node. The purpose of the client manager node is to provide the customer who uses the service to manage and administer each of the virtual storage devices of that customer. Thus, the customer designates one or more of the client nodes as client manager nodes with the ability to provide system wide client side management of the file service. The client manager node is provided with the ability to create and delete entire virtual storage devices on the remote file server nodes. In addition, the client manager node is provided with full access privileges for all of the files and directories on each virtual storage device created by the client manager node and therefore may read, write, modify or delete any file or directory on any of the virtual storage devices it creates. Furthermore, the client manager node is able to designate new user accounts and to provide sufficient information to enable a client user to join one or more of the virtual storage devices managed by the client manager node.

The public server and file server software illustratively is deployed at the remote file server nodes, e.g., computer terminals h9 and h10. The public server and file server software performs the following functions:

(a) Creating and deleting virtual storage devices, including allocating space amongst the actual physical storage devices of the remote file servers for meeting the space requirements needed and/or purchased by the client/customer;

(b) Accepting requests from client manager nodes to create client user accounts, including generating one-time passwords for enabling client users to join pre-subscribed user groups of the virtual storage device and requests from client manager nodes to delete client user accounts;

(c) Arbitrating accesses to file data amongst all client nodes, including enforcing access privileges and file sharing modes;

(d) Maintaining integrity of accessed file data including performing version checks, and providing up-to-date copies of accessed file data to client nodes which desire to access them;

(e) Providing a "rendezvous service", i.e., providing to inquiring client nodes sufficient address or contact information (e.g., IP address and TCP port number) for communicating with the appropriate remote file server node which stores the group of files corresponding to a given virtual storage device.

Interace/Environment Description

Prior to addressing the techniques by which security and authentication are enforced, and file integrity is maintained, a description is provided below of the effect achieved by the file service according to the present invention. As noted above, FIG. 3 shows three client node software elements, namely, the volume management, file system and disk subsystem. These software elements are designed to integrate with a conventional operating system/native file system 48 which may be sold with the client node. The manner by which the client node software is integrated with the operating system/native file system 48 may be specific to each operating system/native file system 48 and is normally dictated by specification and application programming interfaces of the operating system/native file system creator. For example, Microsoft™ specifies an API for integrating software affecting the manner by which files are identified and retrieved by other applications and programs executed with the Windows N™ operating system. Thus, the specific details of the integration of the client node software are omitted below. Rather, the discussion below describes in general the operations carried out by the client node software to achieve certain ends according to the invention. Those skilled in the art will appreciate how to modify the client node software for each operating system/native file system with which the client node software is to work given the description below of what is to be achieved and other available information pertaining to the API's of the operating system/native file system.

Figure 4:
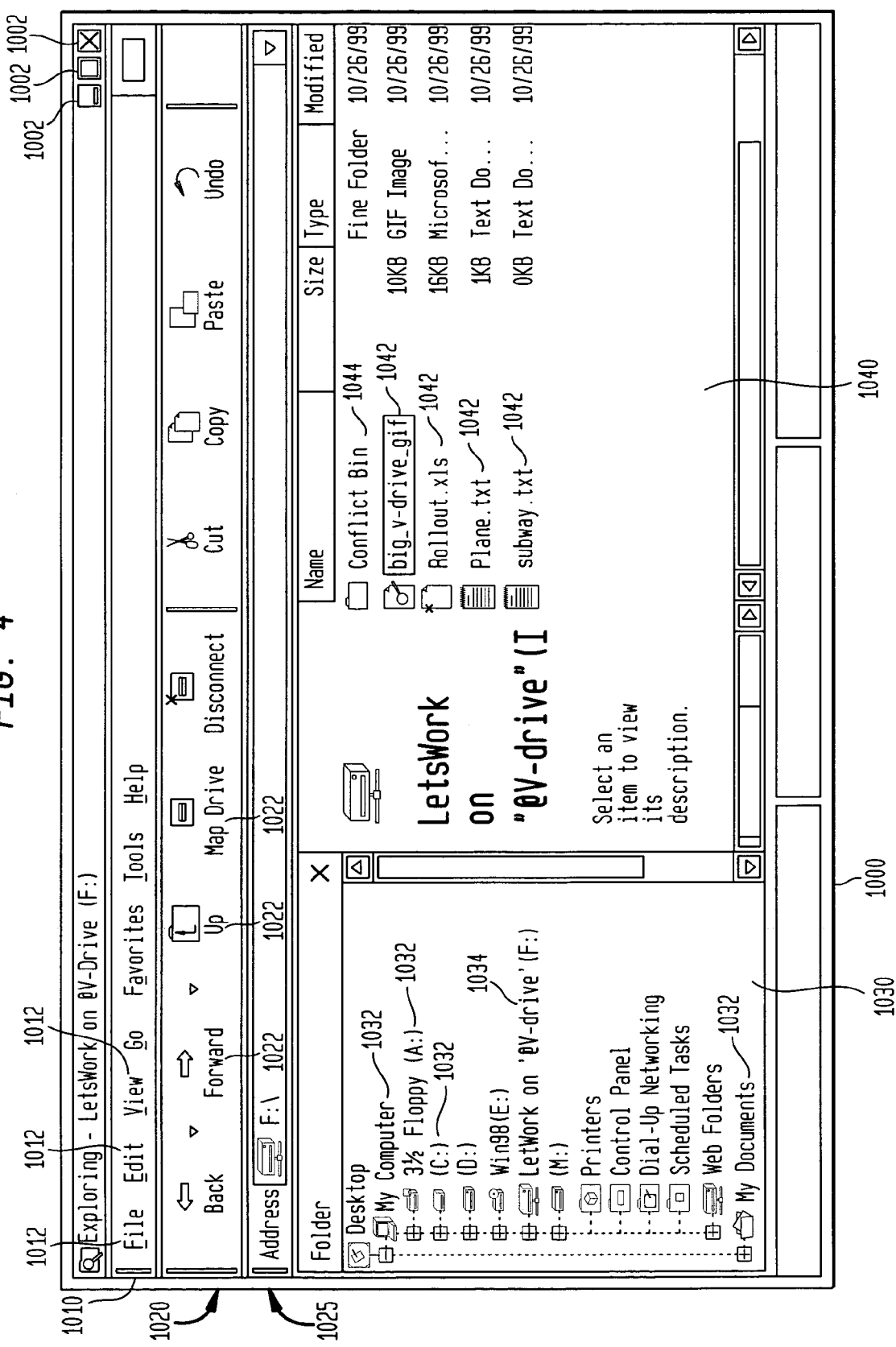
FIG. 4 shows an illustrative screen displayed on a client node according to an embodiment of the present invention.

FIG. 4 shows an illustrative image which is depicted on the display monitor of a client node while using the invention, e.g., with the Microsoft™ Windows NT™ operating system. As shown, the displayed image is the familiar image of a window 1000, including "buttons" 1002 for resizing and closing the window 1000, menu bar 1010 with selectable drop-down menu buttons 1012, "standard button bar" 1020 with selectable "navigation buttons" 1022, "address bar" 1025, "folders" sub-window 1030 and sub-window 1040. As shown, the address bar 1025 includes a graphical icon representing a network connected storage device labeled "F". The "folders" sub-window 1030 displays a hierarchical list of identifiers 1032, 1034 for storage devices and folders thereof. This list includes a corresponding entry 1034 for the network connected storage device "F" and provides further identification information for this device "Lets Work on '@v-drive'". Sub-window 1040 displays another hierarchical list of graphical icons representing files 1042 and folders (directories) 1044 contained on the connected storage device represented by the graphical icon 1034.

As is well known, the hierarchical list of items 1032, 1034, and sub-list shown in sub-window 1040 is intended to show individual files and a hierarchical organization for such files into directories and storage devices. As is well-known, the storage devices shown graphically in the window 1000 can represent entire actual locally present physical storage devices, storage devices which are connected remotely, and virtual storage devices, typically implemented as partitions of the storage capacity of the actual local and remote physical storage devices. The Windows N™ operating system does not distinguish between such storage devices from the perspective of the graphical display to the user.

Illustratively, the identifiers "F" and "Lets Work on '@v-drive'" refer to a virtual storage device provided by the system and service according to the invention. To that end, the client software provides the appropriate information according to the operating system API for providing the appearance of an actual physical storage device. In response, the operating system lists identifiers in the graphical display portion of the user interface (i.e., the images displayed on the display monitor of the client node) to the client user as any other storage device, with the appropriate properties. Furthermore, the operating system enables the user to access these identifiers for the virtual storage device in the same identical fashion as the identifiers for any other storage device. The user can thus "click", "double click," "drag" and "drop" on such identifiers. These actions are well-known selection, activation, movement or re-organization operations achieved with the pointer device and therefore are not described further herein. It should be noted that the client user may also use the DOS™ command line interpreter to access.

Most significantly, the client node software also provides certain functionality for identifying and obtaining files and file data as the object of an action selected by one of the above pointer device actions. For example, if a client user "double-clicks" on an identifier for the virtual storage device "F" or a directory/folder hierarchically listed under virtual storage device "F", this indicates a user command to "open" and view the contents of the virtual storage device or directory/folder, respectively. This requires identification of the appropriate hierarchical sub-directory information for retrieval and listed display by the operating system. Illustratively, the client node software provides such information to the operating system which performs the rest of the tasks. Likewise, if the user "double clicks" on the identifier of a file itself, this serves as a user command to execute an application represented by the file (if the file contains an executable application), or to execute an available application on the file as an object (if the file contains data). Again, the client node software identifies the appropriate file information for the operating system and provides such file data to the operating system which causes the appropriate execution.

Thus, the client node software provides sufficient integration of the functionality described below for identifying and obtaining the appropriate file and providing such information to the existing operating system to enable correct execution. In addition to performing such a task for user initiated execution and selection as described above (e.g., using the graphical display portion of the user interface), the client node software performs such tasks at all times for automatic application initiated file execution or retrieval. That is, suppose an application is currently executing. In the course of execution, the application causes an access to another file (e.g., attempts to execute an application contained in another file or attempts to read, write, modify, etc. the data contained in another data file). In so doing, the application generates the appropriate request to the operating system to perform the appropriate file access operations. If the file is contained in the virtual storage device, the client node software intervenes and assists the operating system in identifying the appropriate file and in providing the data of the file to the operating system to complete the access to the file (i.e., read, write, modify, delete, etc.) The client node software does this transparently and automatically without requiring intervention by the user. This has a net effect from the perspective of the client user and the applications executing on the client node. Specifically, the virtual storage device, and its contents (i.e., all of the files, directories/ folders, etc. stored in the virtual storage device), appears, to the client node user and the application executing at the client node, to be locally present. That is, the client node user and applications executing at the client node access the virtual storage device and its contents in the same manner as an actual locally physically present storage device at which such contents are permanently and persistently stored/"homed". In essence, neither the client user nor the application executing at the client node is aware of the actual location or home of the files as the integration is perfectly transparent and seamless.

Thus, the actual providing of data to applications, useful display of the status or arrangement of files and directories/folder, etc. is performed by the operating system. The client node software merely serves to locate and obtain valid copies of remotely stored or homed directory/folder information and file data. As described in greater detail below, the performance of these tasks by the client node software often requires several steps. The client node software may determine if a copy of the directory/folder information or file data is cached locally (e.g., in a cache memory, main memory, or disk actually physically present at the client node). The client node software may verify that the locally cached copy of the directory/folder information or file data is still valid. The client node software may download a valid copy of the directory/folder information or file data. Periodically, the client node software may upload the directory/folder information or file data to permanently store modifications.

In addition, many operating systems and executable applications support various "granularities" of file sharing. In a most basic form of file sharing, only one client node, out of a group of multiple client modes having sufficient access privilege rights, can actually access a file at one time. The operating system or native file application programming interface simply does not permit extensive file sharing. According to another method of file sharing, multiple client nodes are permitted to read information from a file simultaneously, but only one client node is permitted to write to such a file. According to another paradigm, each client node has the ability to simultaneously write to a file or part of a file. To achieve this, each client node may actually perform its respective write indirectly, e.g., through a single intermediary node which actually performs each access on behalf of each client node. For example, a directory file is a file containing data for locating and accessing all of the files and subdirectories of a given directory. Each time a new file or subdirectory is added to the given directory, or an existing file or subdirectory is deleted from the given directory, the respective directory file must be modified to reflect the change. Multiple client nodes must be able to perform such modifications simultaneously. To enable this to happen, the directory file is not actually directly accessed by each client node. Instead, the accesses to the directory mode are performed by a single node, e.g., one of the remote file server nodes on behalf of each client node. Thus, as each client node attempts to modify the directory, the remote file server node functions as an intermediary node which performs each required access (most notably a modification or write operation) on behalf of each client node. When a client node creates a new file or subdirectory in a directory, in fact, the client node does not actually directly access the directory file. Instead, the directory file access is performed by the remote file server node as an intermediary.

The client node software assists in achieving such file accesses in a coherent fashion. Most notably, the client node software can transmit to the remote file server commands for "locking" files or portions of files to prevent access to such files or file portions according to incompatible modes. The net effect is to prevent another client node which desires to access the file from doing so. Likewise, the client node software can transmit query commands to the remote file server regarding the lock status of files and can receive and forward the response to such commands to the operating system to prevent an access by this client node which is incompatible with an access currently being performed by another client node. Again, the generation of file locking commands, and determination of when a certain file access can be performed in view of the lock status on files, is achieved according to the operating system or other applications executing at the client node. The client node software merely serves as a proxy for forwarding such commands and statuses between the client node and the appropriate remote file server node. All such functionality performed by the client node software is automatic and transparent to the client node user and applications executing at the client node.

Adding Client Users

Figure 5:
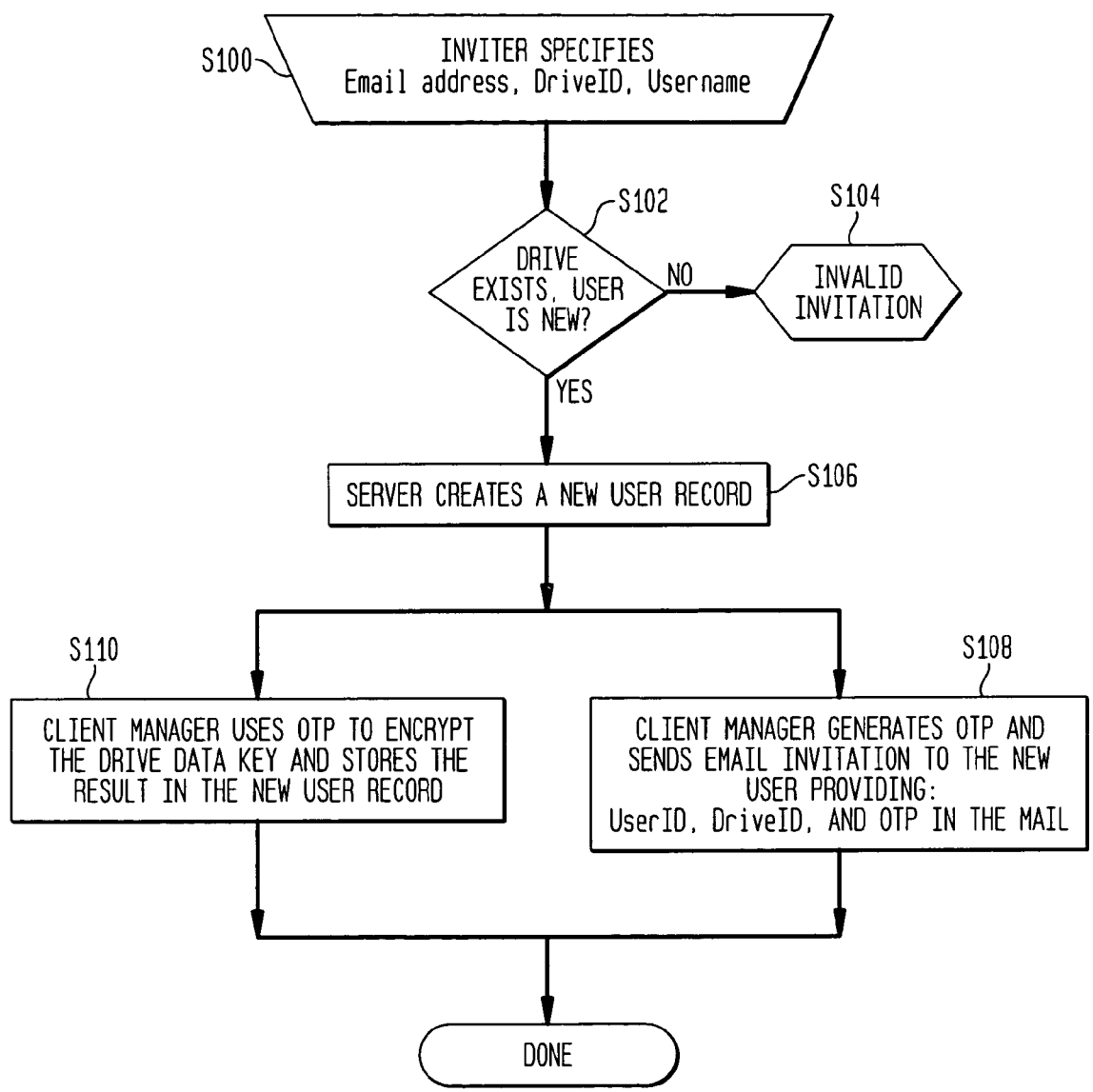
FIGS. 5, 6A and 6B show a flowchart describing a process for joining a new client user to a group of users permitted to access a virtual storage device according to alternate embodiments of the present invention.

FIG. 5 shows a process for creating a virtual storage device and adding users. Assume that the user of the client manager node has already allocated the virtual storage device in question. Under control of the user of the client manager node in step S100, the client manager node issues a message containing a command to invite a new user, the email address of the new user, a user name for the new user and an identifier of the virtual storage device ("drive id") of the virtual storage device on which the new user is to be invited. Illustratively, this is achieved by the client manager node transmitting the message via the Internet to a remote file server node which manages the specific virtual drive. In steps S102, the remote file server node determines if the virtual storage device indicated by "drive id" exists but the user name is already contained on a list of users. Illustratively, the remote file server node maintains a list of all user names who ever joined the virtual storage device, including active user names of users of the group permitted to access the virtual storage device, and deactivated user names. If the user name is not new, or the virtual storage device does not exist, then the remote file server node rejects the request in step S104, by transmitting back to the client manager node via the Internet, a rejection message. Illustratively, the client manager node displays a failure message to the user. Advantageously, this prevents multiple uses of the same user names for a given virtual storage device.

If the user name is not already contained on the list associated with the specified virtual storage device, the remote file server node creates a record for the new user in step S106. The remote file server node communicates the successful completion of this step to the client manager node. Next, in step S108, the client manager node creates a one time password ("OTP"). Preferably, the OTP is a bidirectional encryption/decryption key. In addition, the client manager node communicates to the new client user an invitation to join the group of user permitted to access the virtual storage device, which invitation includes the user name ("user id"), the identifier of the virtual storage device ("drive id"), and optionally the OTP. Illustratively, the client manager node can email the invitation to the new client user node via the Internet, by addressing the email message to an Internet address of the client user. Preferably, the email message is transferred in a secure fashion, e.g., in encrypted form, to prevent unauthorized discovery of the OTP. To add additional security, the OTP may not be included in the email invitation. For example, the new client user may have to communicate with an intermediate Internet address to receive the OTP upon validation of the new client user. Once the new client user obtains the OTP, the client manager node encrypts a data key (the purpose of which is described in greater detail below) with this OTP, to produce OTP(data key). The client manager node then transmits OTP(data key) to the remote file server node where it is stored in the record associated with the new client user, in step S110.

Figure 6A:
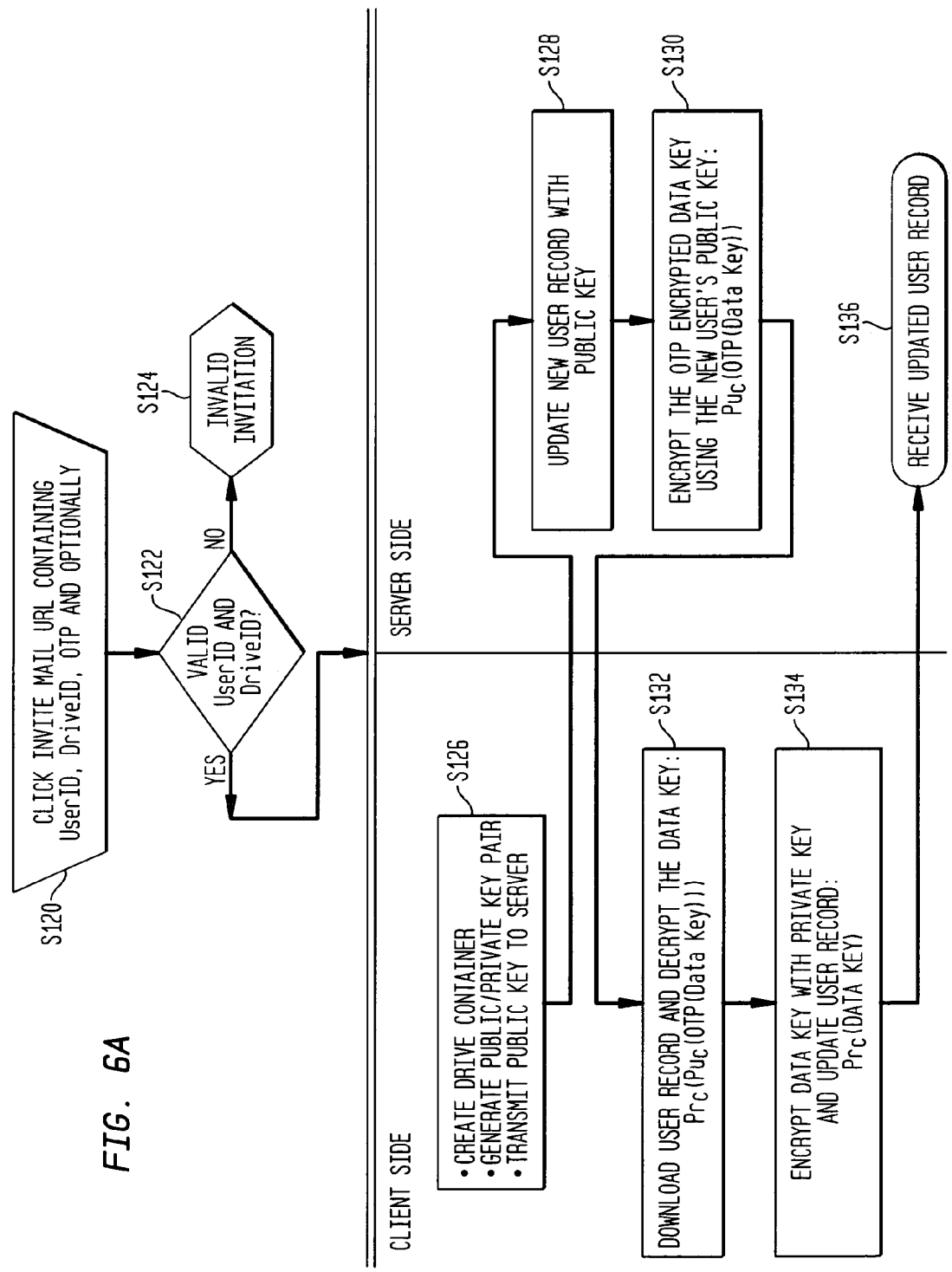
Figure 6B:
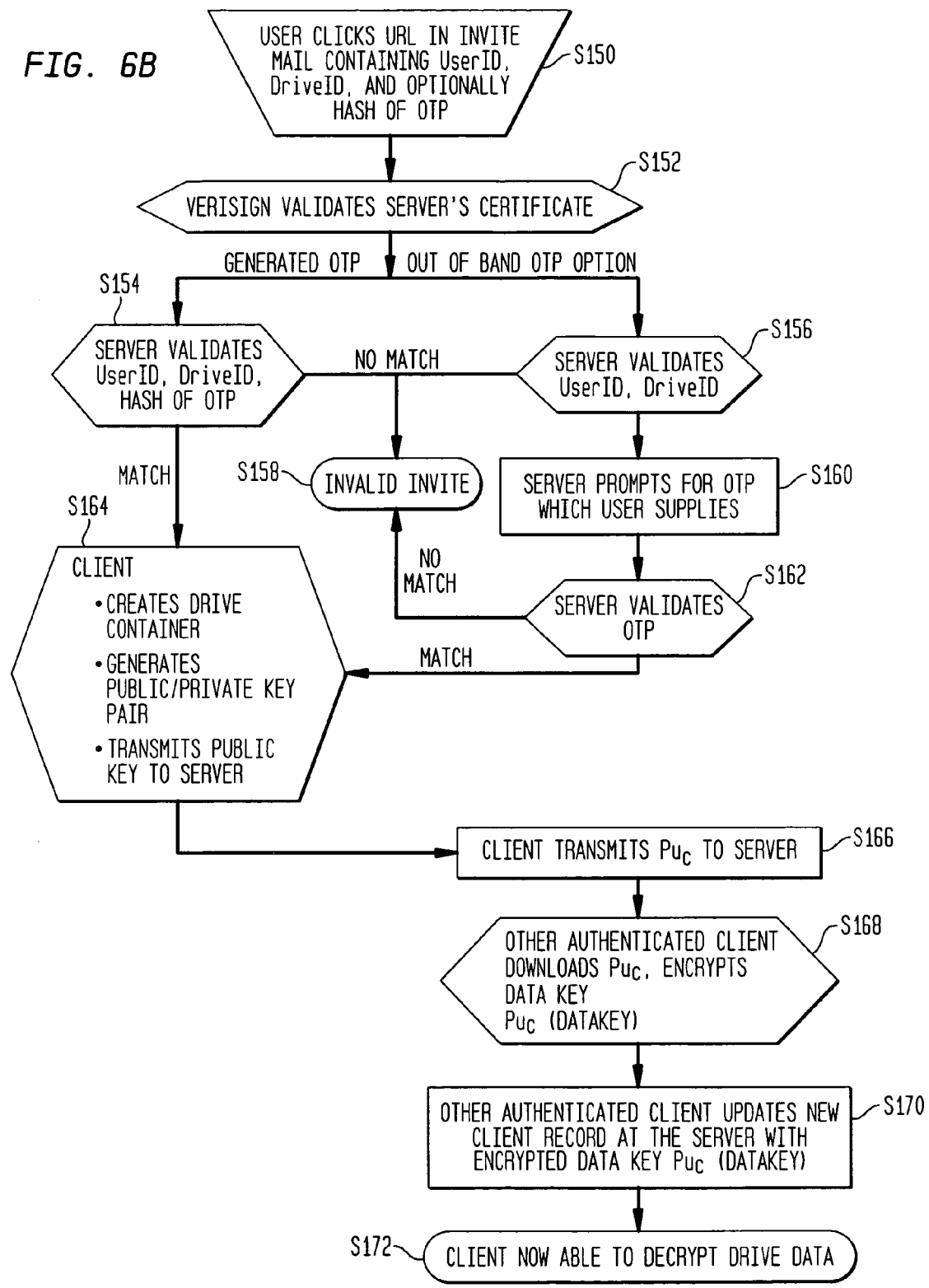

FIGS. 6A and 6B each show a flowchart illustrating alternative processes by which a new client user joins a pre-subscribed user group permitted to access a virtual storage device. In regard to FIG. 6A, assume that the new client user receives the above-described invitation, e.g., as an encrypted email message, at a particular client node. In step S1120, the client user activates the join process by clicking on the email message. Illustratively, the email message includes the URL of the remote file server node at which the client node user can join the pre-subscribed user group for the virtual storage device. Alternatively, the message includes the URL of another site from which the client node subscription request can be redirected to connect with the correct remote file server node specific to the virtual storage device of interest to the client node user. The activation of the join process results in the transmission of a message from the client node to the appropriate remote file server node, e.g., communicating the user name and identifier for the virtual storage device to the remote file server node. Illustratively, this is achieved using the so-called https protocol. For example, the remote file server node to be contacted may be registered with a trusted third party. Such authentication services are provided by companies such as Verisign™, a company located in Mountain View, Calif. In step S122, the remote file server node accesses the list of records to determine if it has an entry corresponding to this new client user. If not, in step S124, the remote file server node deems the message invalid and ceases processing. If desired, the remote file server node can be adapted to transmit a message to the client node indicating that the join request was invalid.

Assume that the client node receives a message indicating that the remote file server node can proceed with the subscription process. If the client node does not already have the appropriate client node software, this message may be in the form of, or include, a download of the appropriate software. This download can include one or more URL addresses of one or more remote file server nodes with which the client node should connect in the future to perform actual file access operations. In any event, the client node executes the client node software. Next, in step S126, the client node creates a drive container to store information needed for authenticating information when connecting and for caching including files, folders, user objects, access permission objects, etc. The client node also generates a public key/private key pair Puc, Prc. The client node then transmits the public key Puc to the remote file server node. Illustratively, this pair of keys is randomly generated according to any well-known algorithm for so doing. The client node permanently stores the private key Prc for subsequent use as described below.

Next, in step S128, the remote file server node stores the public key of the client node in the record associated with the client node. In addition, in step S130, the remote file server node encrypts the already encrypted message OTP (data key) using the public key Puc to produce the twice encrypted message Puc(OTP(data key)). The remote file server node then transmits this twice encrypted message Puc(OTP(data key)) to the client node. Illustratively, the remote file server node also transfers it's own public key Pus to the client node. The client node stores the remote file serve node's public key Pus for further use as described below.

In step S132, the client node receives the twice encrypted message Puc(OTP(data key)). Using the client node's private key Prc and the one time use key OTP, the client node decrypts this twice encrypted message to obtain the data key. Then in step S134, the client node encrypts the clear text data key using its public key Puc to produce the encrypted data key Puc(data key). The client node then transmits this encrypted data key Puc(data key) to the remote file server node. In step S136, the remote file server node receives the encrypted data key Puc(data key) and stores this information, along with the public key Puc of the new client user. This completes the join process.

In the alternative process of FIG. 6B, the user, upon receipt of an email invitation, activates the join process in step S150 by clicking on the email message. The email message includes the user id, the drive id, and optionally a hash of the OTP. In step S152, a trusted third party, such as Verisign™, validates the "certificate" or authenticity of the remote file server identified by the drive id. If the hash of the OTP was included in the email invitation, the process proceeds to step S 154 and the remote file server validates the user id, drive id, and the hash of the OTP. If there is a match, i.e., the remote server validates the above, then the process proceeds to step S164 which will be described below.

Referring back to step S152, if the hash of the OTP was not included in the email invitation, then the remote file server validates only the user id and drive id. As stated above, the new client user obtains the OTP separate from the invitation email. If there is a match, then in step S160 the remote file server prompts the client user to supply the OTP which is validated in step S162. If there is no match in either step S156 or step S162, then the invite is invalidate in step 158. Otherwise, the process proceeds to step S164.

In step S164, the client node creates a drive container and generates a public key/private key pair Puc, Prc. The client node then transmits the public key Puc to the remote file server node in step S166. As with the process of FIG. 6A, the client node permanently stores the private key Prc for subsequent use as described below. Next, in step S168, a different, authenticated client user of the same pre-subscribed user group downloads the new client user's public key Puc and encrypts the data key Puc (data key). In step S170, the authenticated client user updates the new client user record at the server with the encrypted data key Puc (data key). At this point, the new client user may now decrypt the remote file server drive data corresponding to the data key, in step S172.

As will be seen below, the data key is a two-way encryption/decryption key which is used to encrypt data prior to uploading it from a client node to the remote file server node or for decrypting data downloaded from the remote file server node. At no time does the remote file server node have a clear-text version of the data key. Rather, the remote file server node only has encrypted versions of the data key, namely, either OTP(data key) or Puc(data key). In fact, the remote file server node has one encrypted version of the data key for each client node, as encrypted with the public key of that client node.

In contrast to the OTP and the data key, the public/private key pair Puc, Prc are one-way keys. That is, the public key Puc can be used to encrypt a message. However, such a message can only be decrypted with the corresponding private key Prc. Thus, while the remote file server node maintains the public key Puc and the data key encrypted by the respective public key Puc(data key), this information is not sufficient for the remote file server node to decrypt the data key.

The process described in this section is only used once to join a client node to a virtual storage device. Subsequently, all accesses by that client node to the virtual storage device which it has joined are achieved using the authentication and secure file transfer processes described below. Moreover, each OTP can be used only once.

It should be noted that the above processes illustrated in FIGS. 5–6 can be repeated for each client node user. Likewise, these processes can be repeated for a given client node user for each of multiple different virtual storage devices to be joined for the client node.

Illustratively, the client node creates an identity profile which is a locally stored data file with sufficient information for enabling the client node to access the virtual storage device. In the very least, the identity profile includes the private key Prc which is necessary for a given user to authenticate (as described below), and to retrieve (its copies of) the data key(s). Illustratively, the copy of the identity profile is encrypted on the client node with a key derived from a user supplied password. This prevents an unauthorized user of the client node from posing as the actual user who joined the pre-subscribed user group of the virtual storage device. The (encrypted) identity profile may be copied onto a removable storage medium (e.g., a floppy diskette) and/or placed on multiple client nodes. The client node user can then access the virtual storage device from each client node provided with a copy of the identity profile. In addition, a copy of the separately stored identity profile, e.g., on a removable medium, enables the user to restore the identity profile on any given client node, should the client node software become damaged or corrupted. This is very important as the private key Prc is known only to the client node and the manner by which the data is stored at the remote file server node is unknown to the remote file server node. Absent backup copies of the client node identity profile, it will be impossible for that user to access the remote file server node under the given client user account should the client node software be damaged or corrupted.

Authentication and Secure Transfer of File Data

Figure 7:
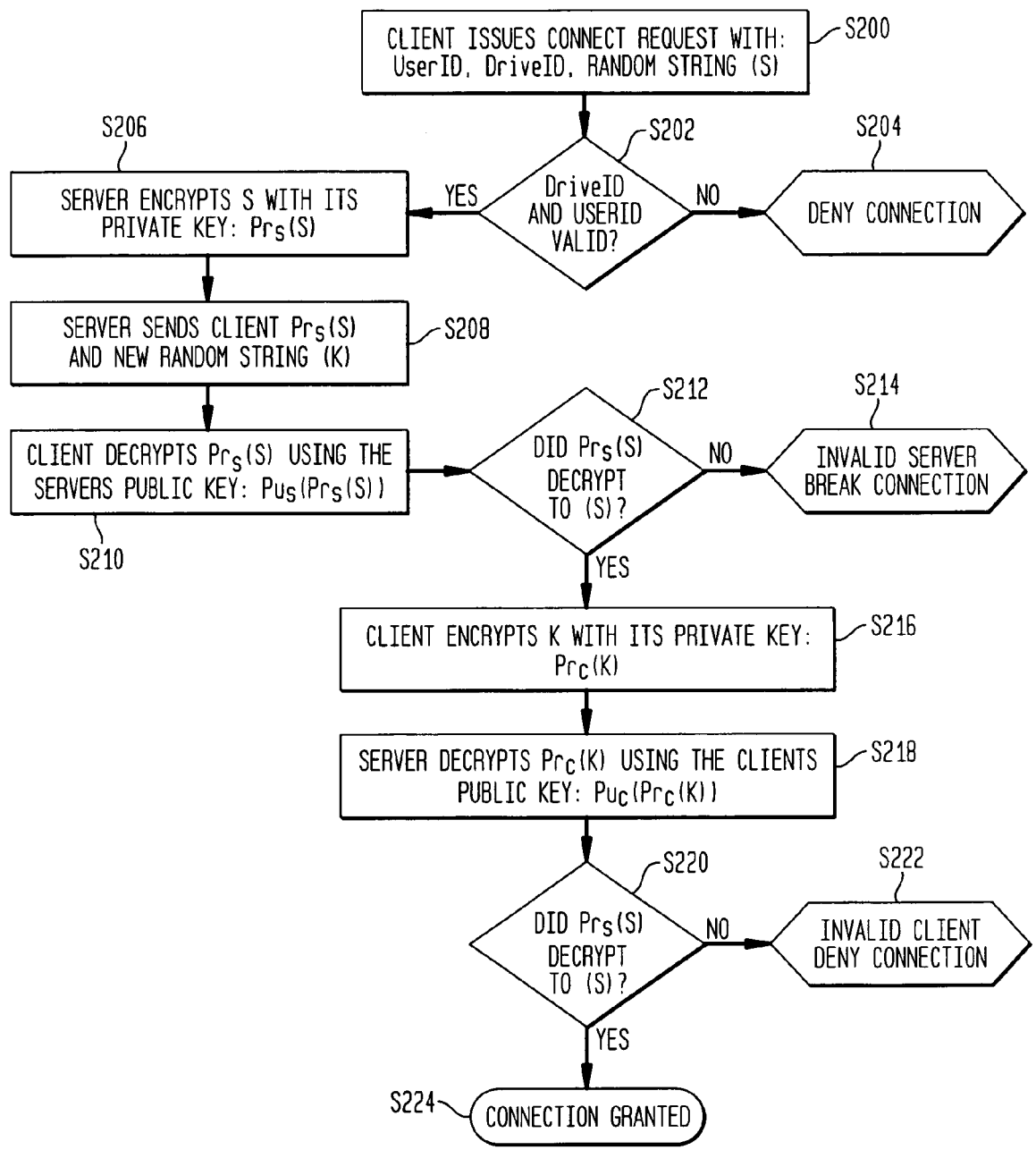
FIG. 7 shows a flowchart describing an authentication process according to an embodiment of the present invention.

FIG. 7 shows a flowchart describing a process for authenticating a connection between a client node and a remote file sever node. This process is performed each time the client node and remote file server node establish a connection, assuming that the client node has already joined the pre-subscribed user group of the virtual storage device that it wishes to access by the respective connection.

In step S200, the client node issues a connection request message via the Internet to the remote file server node. Illustratively, the client node issues the message to a pre-established URL address assigned to the appropriate remote file server node implementing the virtual storage device to be accessed by the client node. Illustratively, the message includes the user name of the client node user, the identifier of the virtual storage device to be accessed and a random string S. In step S202, the remote file server node receives the message and first determines if the user name and virtual storage device identifier are a valid combination by consulting a list of valid, pre-subscribed user names stored at, or otherwise accessible by, the remote file server node for the respective virtual storage device identified by the virtual storage device identifier. If the remote file server node fails to confirm that the user name is contained in a list of active user names for the virtual storage device, the remote file server node denies the connection in step S204. In denying the connection, the remote file server node may issue an appropriate rejection message to the client node.

Assume that the remote file server node confirms that the user name is listed as active on the list associated with the virtual storage device indicated by the identifier in the message. In step S206, the remote file server node encrypts the random string S with its private key Prs to produce the encrypted random string Prs(S). In step S208, the remote file server node transmits this encrypted random string Prs(S) and a second random string K to the client node.

In step S210, the client node decrypts the encrypted random string Prs(S) with the public key Pus of the remote file server node in order to obtain the clear text message of the original string S. In step S212, the client node determines if this decryption of the received encrypted message using the servers public key, Pus(Prs(S)), yields S. If not, then the client node determines that it has failed to authenticate the identity of the remote file server and breaks the connection in step S214. On the other hand, if this decryption of the received encrypted message using the servers public key, Pus(Prs(S)), yields S, then the client node determines that it has successfully authenticated the identity of the remote file server node. Thus, the client node presumes that only the remote file server node has the capability (most notably, the counterpart private key Prs) for encrypting S in a fashion that it can be perfectly decrypted using the server's public key Pus to recover S.

Assume that the client node has successfully authenticated the identity of the remote file server node. Next in step S216, the client node encrypts the second random string K with the client node's private key Prc to produce the encrypted second random data string Prc(K). The client node then transmits the encrypted second random data string Prc(K) to the remote file server node. In step S218, the remote file server node attempts to decrypt this received encrypted second random data string Prc(K) with the public key Puc stored for this client node (for accesses to this virtual storage device). In step S220, the remote file server determines whether or not the attempted decryption with the public data key of the client node, Puc(Prc(K)) yields the second random data string K. If not, then in step S222, the remote file server determines that it has failed to authenticate the identity of the client node and denies or breaks the connection. On the other hand, if the attempted decryption with the public data key of the client node, Puc(Prc(K)) yields the second random data string K, then the remote file server node determines that it has successfully authenticated the identity of the client node. That is, the remote file server node determines that only the client node has the capability (most notably, the appropriate private key Prc) for encrypting the random string K in a fashion such it is decrypted with the public key Puc, to yield the second random string K. In such a case, the remote file server node grants the connection in step S224.

Thus, in summary, the client node authenticates the identity of the remote file server node and the remote file server node authenticates the identity of the client node. The connection is deemed authenticated only if the client node authenticates the identity of the remote file server node and the remote file server node authenticates the identity of the client node. After the connection is authenticated, the client node can access file data at the remote file server node in a fashion which maintains the integrity of the file data (as described below).

Next, a process is described by which file data (and possibly other sensitive information, such as directory information, etc.) is securely uploaded and downloaded via the authenticated connection between the client node and the remote file server node. As noted above, the Internet actual consists of several private networks maintained and operated by unknown parties. Neither the client node nor the remote file server node makes any assumptions regarding the security of data in transit over the Internet and instead the presence of unauthorized eavesdropping parties is presumed to be ever-present. Moreover, the client node also does not presume that the remote file server node is secured and takes measures to ensure that no unauthorized access to the file data can occur at the site of the remote file server node(s).

Figure 8:
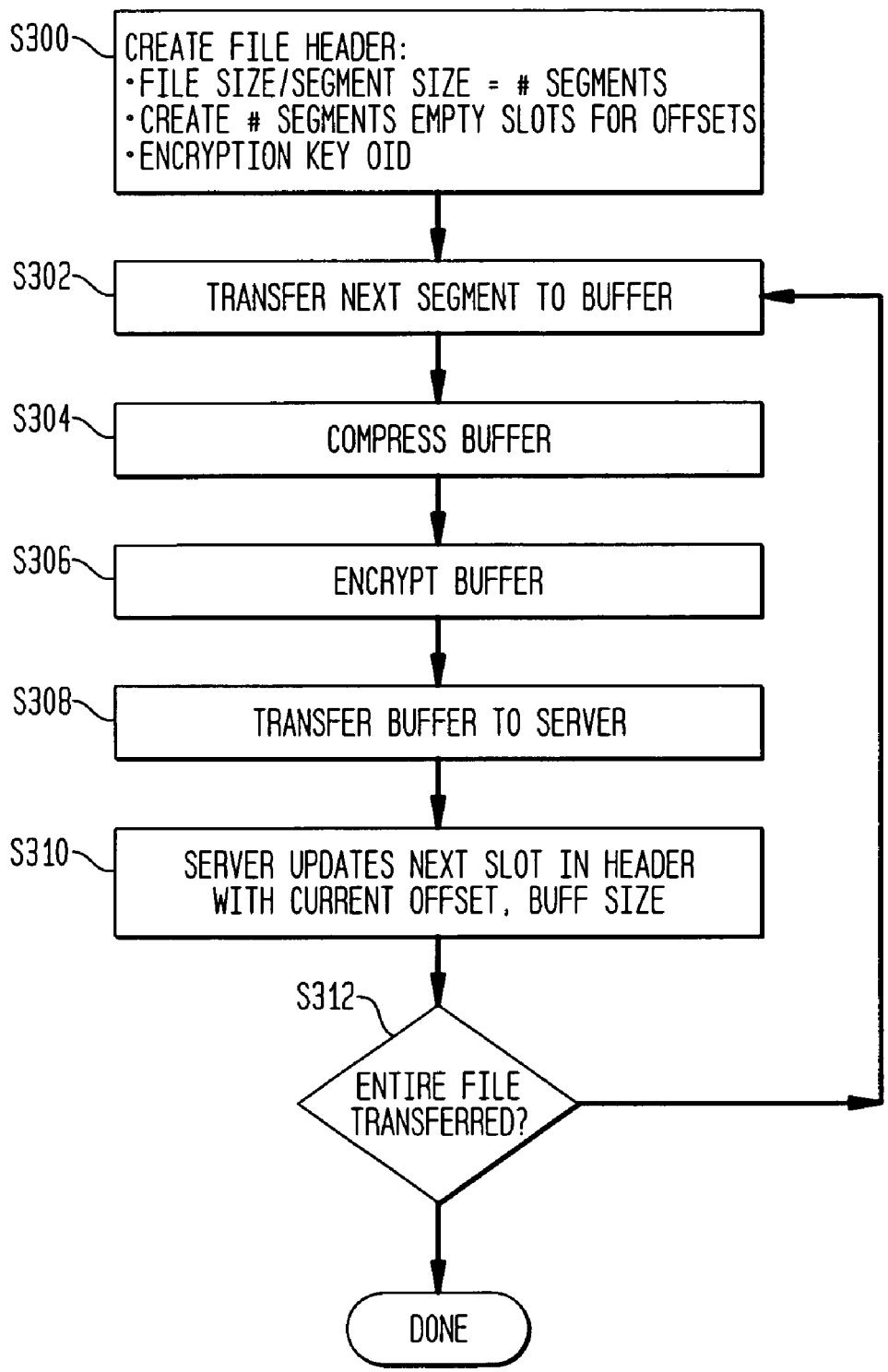
FIGS. 8 and 9 show flowcharts describing, respectively, a download process and an upload process according to an embodiment of the present invention.

FIG. 8 illustrates a process carried out for secured uploading of file data from the client node to the remote file server node. Assume that the client node has file data to upload to the remote file server node. In step S300, the client node creates a file header including the information indicating the file size, segment size and number of segments. It may be possible to actually provide less information. For example, if the segment size is constant over the file transfer, but not known ahead of time, then the file size and segment size need only be specified (the number of segments being the quotient of the file size/segment size). Alternatively, only the number of segments and the segment size need be specified. In addition, when writing only a portion of a file, i.e., less than all of the segments, it is desirable to specify an offset from the beginning of the file at which the uploaded file data portion is to be written. The offset can, for example, be specified by the number of segments or empty slots specifying the amount of data to skip forward from the beginning of the data file before writing the uploaded data. In addition, the file header illustratively includes an object identifier (OID) for the particular data key used for encrypting the file data to be uploaded. By adding a data key to the OID, it is possible to use multiple data keys to encrypt the data on a given virtual storage device. The OID can be used to identify which data key must be used to encrypt or decrypt the file data.

In step S302, the client node transfers the next to-be-uploaded segment of file data to a buffer. Illustratively, the buffer is a portion of main memory storage space of sufficient capacity for holding the segment data temporarily. Next, in step S304, the client node compresses the file data segment in the buffer. This reduces the amount of information (i.e., number of bits) representing the file data segment. Illustratively, a lossless entropy coding compression technique is used, such as Huffman encoding. In step S306, the client node encrypts the compressed data in the buffer using the data key. Illustratively, the particular encryption technique used allows for decryption with the same data key. Any one of a number of well-known encryption techniques can be used, such as RSA™'s 128-bit key RC5™ encryption technique. In step S308, the client node appends the header created in step S300 to the encrypted data and transmits the data via the (I/O device of the client node and the) Internet to the remote file server node. Illustratively, the transmission control protocol and the Internet protocol (TCP/IP) are used to transmit and to acknowledge uncorrupted receipt of data. In step S310, the remote file server node receives the transmitted encrypted and compressed file data including the header. Using the offset information in the header, the remote file server locates the correct storage space, within the respective (master) copy of the file at the remote file server node, at which writing is to begin. The remote file server node then writes (causes the storage device to write) the encrypted, compressed file data segment beginning at the respective offset.

At step S312, the client node determines if the transfer of the portion of the file has completed. If not, the client node returns to step S302 and transfers the next to-be-uploaded segment to the buffer. Note that in step S308, the client node may omit or suitably modify the file header in whole or in part for subsequently transmitted encrypted and compressed file data segments. When the client node determines that the last encrypted and compressed file data segment has been transferred in step S312, the upload process stops.

It should be noted that the above-description presumes that the client node had the necessary file sharing rights and privileges access rights to perform the above noted upload operation. It is also presumed that the client node had the most recent or updated version of the data uploaded. A discussion as to how this is achieved is described below. (However, it should be noted that the enforcement of privilege access rights and file sharing modes illustratively is primarily a function of the operating system. The role of the system according to this embodiment of the invention is primarily to convey the results of such enforcement and certain other file integrity maintenance operations described below. As such, the discussion pertaining to file sharing mode adherence and privilege access rights is abbreviated.)

Figure 9:
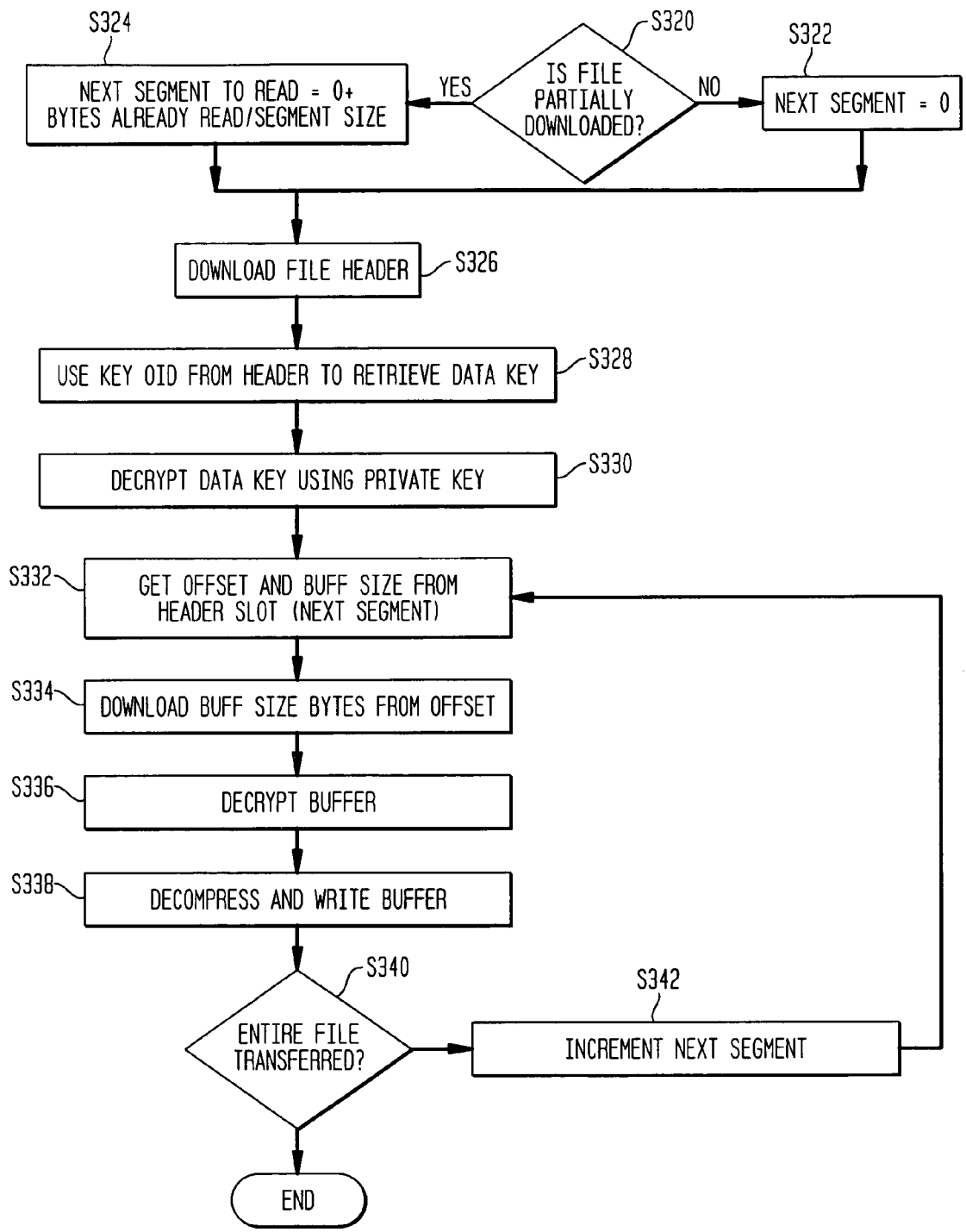

FIG. 9 illustrates a download process for securely transferring file data from the remote file server node to the client node. The process in FIG. 9 presumes that an authenticated connection has been established and the client node transmits a request to the remote file server node to download part of the file.

Note that the request can be a new request, i.e., a request not previously initiated, or a request to resume a partially completed process. The former would occur if the communication channel between the remote file server and the client node is interrupted or closed before completion of the download request. Thus, in step S320, the remote file server node initially determines if the download request is new or if the download request is to resume/complete transfer of file data which request has been partially satisfied. If this is a new request, in step S322, the remote file server node sets an internal counter "Next Segment" to indicate the first to-be-downloaded segment, e.g., equal to zero. On the other hand, if the request received at the remote file server node is to resume a partially completed request, then, in step S324, the remote file server node sets the internal counter "Next Segment" to indicate the next to-be-downloaded segment following the last successfully downloaded segment, e.g., equal to the bytes already successfully downloaded divided by the segment size.

In any event, after either step S322 or S324, in step S326, the remote file server node transmits to the client node the file header stored for the file from which the client node has requested file data. The client node receives the file header and obtains the OID of the data key from the file header. In step S328, the client node uses the OID to retrieve the appropriate data key using the OID, including, if necessary, requesting that the remote file server download the appropriate data key. In such a case, the client node transmits a request for the appropriate data key to the remote file server node. The remote file server node uses the OID to identify the appropriate encrypted data key and transmits this encrypted data key to the client node. Illustratively, the encrypted data key is retrieved from a list of encrypted data keys stored in the client user record associated with the client user currently operating the client node. The manner by which multiple data keys are stored at the remote file server node is described in greater detail below. In step S330, the client node obtains the appropriate encrypted data key and decrypts the data key using the private key specific to the client node.

Next, in step S332, the client node extracts the buffer size and header slot/offset information. Initially, such information is specified by the file header. Next, in step S334, the client node transmits a request to the remote file server node to download a portion of file data, of a certain amount of information (e.g., a number of bytes equal to the capacity of a buffer set aside in the main memory of the client node for receiving downloaded data), beginning at a specified offset from the beginning of the data file. The remote file server node responds to this request by retrieving the requested portion of file data from the appropriate storage device and transmitting the portion of file data to the client node, e.g., via TCP/IP. In step S336, the client node decrypts the data in the buffer using the data key obtained in step S330. Then in step S338, the client node decompresses the decrypted data and transfers the decompressed, decrypted data to an appropriate storage location of an internal storage memory (the memory 12 and/or the disk memory 15). For example, considering that the file data is downloaded in segments, the client node illustratively pieces together in proper sequence the downloaded, decompressed and decrypted data segments to reproduce a replica copy of the requested file data. In step S340, the client node determines whether or not the all of the requested file data has been successfully downloaded. If not, then in step S342, the client node increments it's counter of the Next segment to be downloaded and causes steps S332–S340 to be repeated.

As noted above, it is sometimes desirable to generate new data keys. For example, if a certain client user is removed from the group of client users to have access to the virtual storage device, it is desirable to change the manner of encrypting and decrypting new file data from that point forward. The reason is that the removed client user has all of the old data keys and could theoretically use them to decrypt file data intercepted while in transit. In the alternative, it simply might be desirable to use different data keys periodically to thwart security breaches of the entire group of files stored on the virtual storage device through discovery of a single data key. In any event, a client node capable of allocating a new data key for use by the client users of the group does so as follows. First, the client node generates the new data key. This data key may be used to encrypt file data transferred to the remote file server node. The client node then encrypts the new data key using is public key Puc to produce an encrypted new data key Puc(new data key). The client node then transmits (e.g., via the Internet) the encrypted new data key Puc(new data key) to the remote file server with a command for instructing the remote file server node to store the new data key and to assign an OID to the new data key. The remote file server responds by storing the encrypted new data key Puc(data key) in the list of keys associated with the client user operating this client node, e.g., in the client user record for the client user.

Preferably, each client user in the pre-subscribed user group maintains a complete list of all public keys Puc', Puc", . . . , etc. of every other client user of the pre-subscribed user group. The complete list is accurate since every time a new client user is added, the new client user's public key is transmitted to each client user in the pre-subscribed user group.

Alternatively, the client node sequentially requests (e.g., by transmitting request commands via the Internet to the remote file server node) the public key Puc', Puc", . . . , etc. of each client user of the group for which the client node desires to provide the new data key. The remote file server node responds by retrieving and transmitting to the client node via the Internet the public key of each client user Puc', Puc", . . . , etc. which this client user node has requested. The client node then encrypts the new data key using each of these received public keys Puc', Puc", . . . , etc. to produce encrypted new data keys Puc'(new data key), Puc"(new data key), . . . , etc. The client node then transmits to the remote file server node via the Internet each of these encrypted new data keys Puc'(new data key), Puc"(new data key), . . . , etc. for storage in the respective user records associated with the corresponding client user. That is, the encrypted new data key Puc'(new data key) is stored in the client user record associated with the client user having the public key Puc', the encrypted new data key Puc"(new data key) is stored in the client user record associated with the client user having the public key Puc", etc.

Note that the remote file server node never has a clear-text, i.e., non-encrypted form, of any data key. Rather, all the remote file server has in its possession is multiple encrypted versions of each data key, where each data key is encrypted using the public key of a respective client node. However, only the possessor of the respective private key, namely, the respective client node, can decrypt such encrypted data keys. In short, only a given client node knows the respective methodology (in this case, the private key) for decrypting its respective copies of each data key. More importantly, although the remote file server never has a clear-text copy of a data key, it maintains each public which can be used to encrypt such data keys for each client node.

File Access and Integrity Maintenance

The remote file server node and client nodes maintain the integrity of the group of files on the virtual storage device by ensuring that all accesses to the (master) copies of the files maintained on the virtual storage device occur on the most up to date version of these (master) file copies. This can be tricky considering that:

(a) multiple users can access the group of files simultaneously;

(b) depending on the explicit and implicit file sharing modes specified by the native file application programming interfaces for certain files, certain files may be accessed by multiple client nodes simultaneously;

(c) for sake of communication efficiency, a local copy of accessed file data is typically transferred to, and maintained at, the client node so that file accesses tend to occur on the local copy; and (d) this embodiment of the invention supports "disconnected mode" file access, according to which a client node may continue to access the local copy of the file data even though the client node may be unable to communicate with the remote file server node.

However, such file integrity maintenance provides a very predictable outcome for file and directory modifications-either the modification is achieved as expected or not permitted at all. This enables all native operating system application programming interfaces to operate so that all multi-user applications accessing the files function as if the remote file server node and the client nodes, at which such multi-user applications execute, were on the same local area network. In short, although the remote file server node is separated from one or more of the client nodes by a wide area network, and although communication is not always possible between the remote file server node and any given client (and in fact is not guaranteed or even needed between any two of the client nodes), the same expected behavior is achieved as can be anticipated on a local area network which supports multi-user and shared file access.

To achieve these ends, a file version control is added to each file and each directory stored on the virtual storage device (i.e., both with the master copy at the remote file server node and the local copy at each client node). The file version control is used to ensure that, whenever possible, the client node only performs an access on the most up-to-date version of the file data. The file version control is also used to identify conflicting modifications to files and to reconcile them. As can be appreciated, it is highly time consuming and inefficient for the system according to the invention to transfer updated file data and directory information for every opened file from the remote file server nodes to each respective client whenever a change occurs. Instead, the following update policy is performed instead. Whenever a client node attempts to open, create or delete a file, a check is first performed as described below to ensure that the client node has the most up-to-date information. Whenever a client node accesses directory information, a check is performed to ensure that the directory information is up-to-date as of the time of the access. As will be described in greater detail below, in addition to a version check performed according to the invention, file sharing mode and privilege access right checks can also be performed at the same times.

If another client node attempts to access a file currently opened by a given client node, the remote file server node can determine that the file is currently in use by the given client node. The remote file server node can then determine if the given client node is still in communication with the remote file server node or if it is out of communication, i.e., closed its communication channel without closing the file. If the given client node is still in communication with the remote file server node, the remote file server node maintains the ownership or control of the file data by the given client node including enforcing any file sharing mode locking. In this latter case, the remote file server node would only permit access to the data in accordance with the file sharing mode explicitly or implicitly specified by the native application programming interfaces of that particular file. If, however, the given client node is out of communication with the remote file server node, the remote file server node can close the file on behalf of the given client node thereby relinquishing control of the file by that given client node and allowing access by the other client node. As described in greater detail below, this latter set of circumstances, coupled with the given client node's ability to continue to modify its copy of the file while out of communication with the remote file server node, requires each client node to perform a reconciliation operation upon restoration of communication with the remote file server node.

In the case that a client node writes to, or modifies, its local copy of file data or directory information, the client node uploads its modifications to the remote file server node. Illustratively, in the case of file data, the uploading of modified file data is deferred until the client node closes the file. So long as a client node remains connected to the remote file server node, no version checking is needed for uploading and storing file data modifications as no other client node will be granted write access to the same file in a fashion which violates a file sharing mode of the file. However, if the communication channel between the client node and the remote file server node closes, the remote file server node will have closed the file vis-à-vis the client node. It is possible under such circumstances for the remote file server node to have granted write access permission to another client node (as described above) and to have received and stored modifications from that other client. Thus, upon restoration of the communication channel, the client node and remote file server node first perform a reconciliation process, including checking the version of the client node's locally stored copy of the modified file against the version of the (master) copy of the file stored at the remote file server node, as described in greater detail below.

Figure 10:
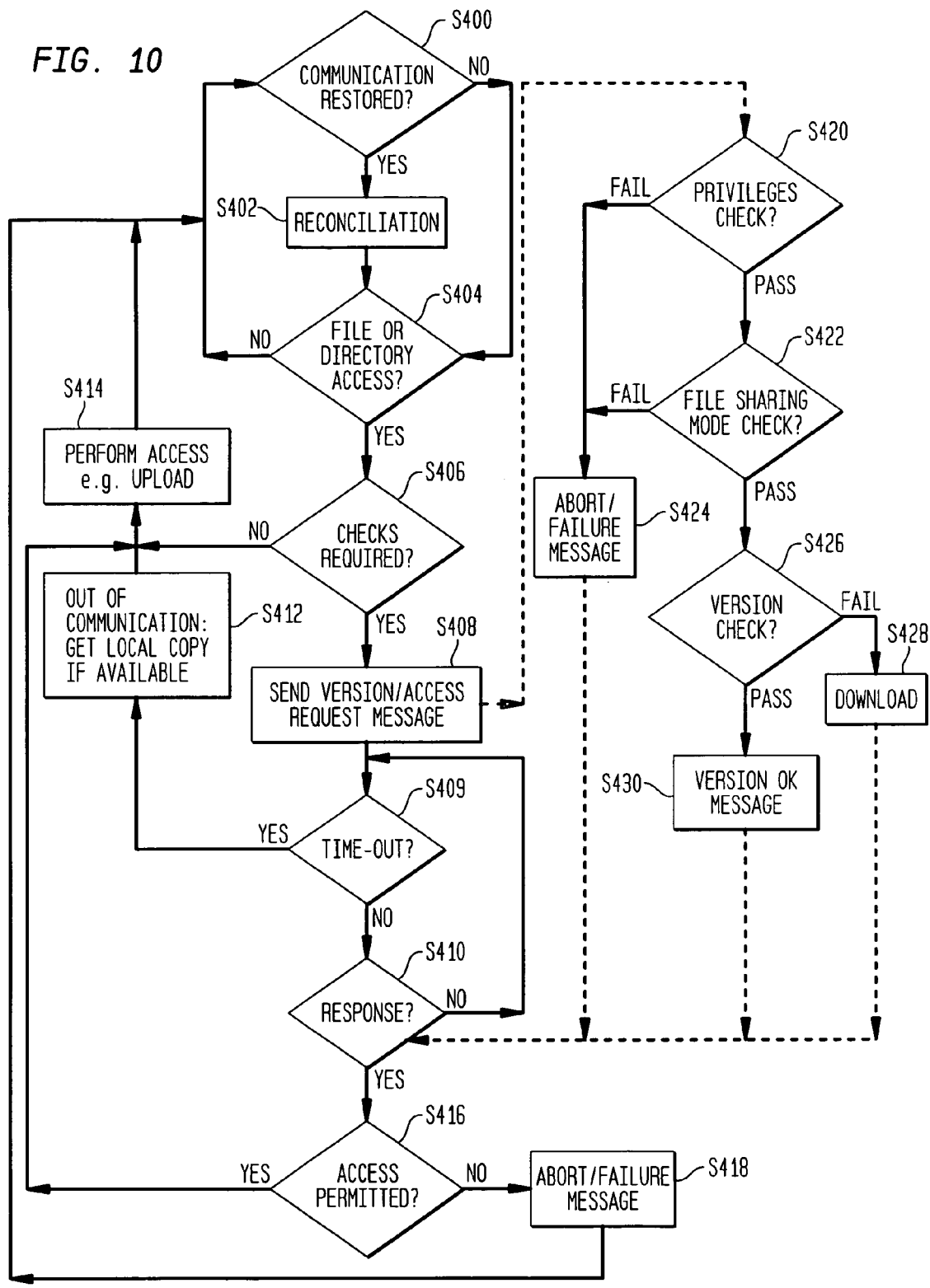
FIG. 10 shows a flowchart describing a file access process according to an embodiment of the present invention.

FIG. 10 illustrates a process executed by the client nodes and the remote file server nodes. Assume that the client node and remote file server node have already authenticated the connection. In step S400, the client node determines if communications have been restored. This can occur by reason of establishment of a new connection or by reason of restoration of communication with the remote file server node after detection of a loss of communication with the remote file server node, even with an existing connection. If so, the client node and the remote file server node engage in a reconciliation operation in step S402. This is described in greater detail below.

Next, in step S404, the client node determines whether or not there is a need to access a file or directory of the file group stored on the virtual storage device. Here, the term "access" includes the operations of "read," "modify/write," "create," and "delete." If no such access is detected at the client node, the client node returns to step S400.

Assume now that a file or directory access must be performed at the client node. In step S406, the client node determines if the requested operation is one which requires a version check. Illustratively, any access to directory information, or the operations of opening, creating or deleting a file require a version check. However, operations of examining or changing the contents of an already opened file do not require a version check. Also, the operations of closing a file and uploading the modifications to the file data made by the client node illustratively do not require a version check. If no version check is required, the client node proceeds to step S414 and attempts to perform the requested access operation. Many of the attempted requested access operations are simply performed according to the normal operation of the operating system and/or application executing at the client node through which the access request was generated. However, in the case of a close operation performed on a file modified by the client node, the upload process described above is also carried out for purposes of uploading the modifications to the file data.

If a version check is required, then, in step S408, the client node transmits via the Internet to the remote file server node a request to check the version of the local copy of the file data or directory information currently maintained at the client node (e.g., in the main memory 12 or disk memory 15). The request includes the version number of the respective local copy of the file data or directory information, if a local copy of such information is possessed by the client node. Of course, if the client node lacks any copy of the directory information or file data to be accessed, the client node can instead issue a request for the file data or directory information. The loop of steps S409–S410 is continuously performed until a time-out timer expires in step S409 or the condition of step S410 is satisfied. In step S410, the client node determines whether or not the client node has received any response from the remote file server node. If the client node fails to receive a response form the remote file server node within the time limit of the time-out timer, the client node presumes that it is out of communication with the remote file server node. If so, then in step S412, the client node obtains its local copy of the file data or directory information, if any. In step S414, the client node attempts to perform the access operation on the file data or directory information, e.g., using the operating system or application which requested the access. In this case, the client node attempts to perform the requested access on its local copy of the file data or directory information if the client node has any. Note that if the client node does not have the requisite file data or directory information, the attempted request fails in accordance with the normal operation of the operating system, or application. In addition, if the operation is a close file operation or any operation which modifies directory information, the client node illustratively defers uploading the modifications. As described below, the uploading of such modifications occurs during the reconciliation process S402, if at all.

If, in step S410, the client node received a response from the remote file server node, the client node determines, in step S416, whether or not the access is permitted. As will be described below, there are two circumstances in which the requested access is not permitted, namely, the client node lacks sufficient access right privileges to perform the access and/or the requested access conflicts with a file sharing mode of the file explicitly or implicitly specified by the native application programming interface of the file. If the requested access has been denied or aborted, the client node illustratively provides an appropriate abort/failure message to the user indicating why the access was denied, e.g., displays the message on the display monitor 16, and then returns to the loop S400–S404. On the other hand, if the requested access has been granted, then, in step S414, the client node performs the requested access, i.e., opening a file, creating a file, deleting a file, changing a directory attribute, etc.

Steps S420–S430 are performed by the remote file server node in response to receiving a version/access request message or a simple message to retrieve file data or directory information. In step S420, the remote file server node checks to determine if the client node has sufficient privilege access rights to perform the requested operation. For example, if the client node only has read access privilege rights on all files in a directory and the client node desires to open a file for writing to it, the client node lacks sufficient privilege access rights to perform the requested access. Illustratively the details for this check are performed using operating system software supplied with the remote file server node. If the client node user does not have the requisite access privilege rights, the remote file server node aborts the operation and transmits to the client node via the Internet a message indicating that the client node user lacks the requisite access privilege rights to perform the requested access in step S424. This message is detected by the client node in steps S410 and S416.

Assume that the client node user does have the requisite access privilege rights to perform the requested access. In step S422, the remote file server node next checks to determine if the requested access adheres to implicit and explicit native file sharing modes specified by the native file application programming interface governing the file data or directory to be accessed. As noted, above, such a determination is made using the operating system supplied with the remote file server node. If the requested access does not adhere to the file sharing modes of the file, the remote file server node aborts the operations and transmits via the Internet to the client node a message indicating that the requested access could not be performed at this time as it conflicted with a file sharing mode of the file or directory in step S424. This message is detected by the client node in steps S410 and S416.

Assume that the requested access does adhere to such file sharing modes. In step S426, the remote file server node checks the version number (if any) in the message supplied by the client node against the version number of the (master) copy of the file or directory information stored at the remote file server node. If the version numbers match, then the client node has the most up-to-date version of the file data and/or directory information. In such a case, the file server node simply transmits via the Internet to the client node a message indicating that the client node has the most up-to-date copy of the file data and/or directory information and therefore approves the access in step S430. This approval is detected by the client node in steps S410 and S416.

If the client node did not have any copy of the file data or directory information or if the version number provided by the client node does not match the current version number for the copy of the file data or directory information stored at the remote file server node, the remote file server node performs step S428. In step S428, the remote file server node downloads to the client node the requested file data or directory information, as described in connection with FIG. 8. Amongst other things, this downloaded file data and/or directory information is detected by the client node in steps S410 and S416.

As can be appreciated, a client node can obtain the latest version of file data or directory information and store it as a local copy in order to perform accesses. This provides two benefits. First, the local copy acts as a "cached copy" in that it is much easier to access the local copy than to perform the accesses via the Internet. Second, in the event that the client node is incapable of communicating with the remote file server node, the client node can continue to perform accesses on its local copy.

According to one embodiment, a client node can specify a desire to "hoard" one or more files and/or directories. For example, a client node user can specify a desire to hoard specific files and/or directories. This results in the client node transmitting a message to the remote file server node indicating this hoarding request. In response, the remote file server node monitors each of the files or directories indicated as hoarded by each client node. Periodically, the remote file server node performs a pass over all of the files and directories indicated as hoarded. If the remote file server node detects that such hoarded file data or directories contain recent changes, the remote file server node downloads appropriate modified file data or directory information to each respective client node hoarding the respective files and/or directories. The client node then updates its locally cached copy of the hoarded files and directories. As a result, the client node can ensure that between accesses to such hoarded files or directories, the remote file server node is continuously updating such files and directories.

The net result is that the client node is likely to always have the latest or most updated version of the hoarded files and directories. Thus, when the client node desires to access such hoarded files or directories, the client node likely can avoid any delays in accessing such hoarded files or directories incurred while the latest or most updated version of the files or directory information is downloaded. Moreover, as described below, should the client node access an outdated version of a file while out of communication with the remote file server node, there is a possibility that, upon re-establishment of the communication channel with the remote file server node, the client node user will have to manually reconcile a conflict. By hoarding key files and directories, the client node reduces the risk that an outdated version of the file or directory will be accessed by the client node while out of communication with the remote file server node.

Reconciliation

If the client node is incapable of communicating with the remote file server node, the communication channel is said to be closed. If a given client node closes its communication channel, or, alternatively, the remote file server node closes the communication channel with the given client node, prior to closing a file or directory last accessed by the given client node, the remote file server node can relinquish control of that file or directory by the given client node. This enables another client node to access the file or directory. Nevertheless, the given client node is enabled to access its local "cache" copy of the file or directory while out of communication with the remote file server node. As can be appreciated, it is possible that the two client nodes may perform incompatible modifications to the file data or directory information. According to the invention, an elaborate reconciliation mechanism is provided to reconcile such incompatible changes.

In the reconciliation mechanism according to the invention, modifications made to the (master) copy of file data or directory information are given preference to modifications made by a client node while out of communication with the remote file server node. Nevertheless, there are certain circumstances where modifications made by the client node while out of communication with the remote file server node will be stored at the remote file server node.

As noted in FIG. 10, when a client node restores communication with the remote file server node, the client node performs a reconciliation operation. During this operation, the client node first identifies each local copy of file data and directory information maintained locally in a storage device (e.g., disk memory 15) physically present at the client node. The client node then checks the version of each such locally maintained copy of file data and directory information by transmitting a message to the remote file server node.

In response, the remote file server node checks the version of the respective file data or directory information to see if the same version number is recorded in the (master) copy of the respective file data or directory information maintained by the remote file server node in the virtual storage device. If so, then no modifications were made to the (master) copy of the respective file data or directory information maintained at the remote file server node while the client node was out of communication with the remote file server node. If a modification was made, then the version numbers will not match. The specific actions taken by the client node and remote file server node depend on which modifications were made to the (master) copy of the file data or directory information maintained at the remote file server node and the local copy at the client node. These actions are summarized in FIGS. 11 and 12. In FIGS. 11 and 12, the client node often is required to perform some reconciliation action. Illustratively, the remote file server node transmits appropriate sufficient messages regarding the outcome of the validity check described above for enabling the client node to perform the correct respective reconciliation action.

FIG. 11 contains a chart summarizing the reconciliation actions taken by the remote file server node and the client node in regard to reconciling changes that affect file data or files. For convenience, each cell of the chart is labeled with a row number R1, R2, R3, R4 and R5 and a column number C1, C2, C3, C4 and C5. The rows R1–R5 contain cells indicating the actions taken when the client node: makes no changes to the file data (R1); modifies the file data (R2); renames or moves the file (R3); deletes the file (R4); or deletes the directory containing the file (R5). The columns contain cells indicating actions taken when: no changes were made to the copy of the file data at the remote file server node (C1); the copy of only the file data at the remote file server node was modified (C2); the copy of the file at the remote file server node was renamed or moved (C3); the copy of the file at the remote file server node was deleted (C4); or the directory containing the file at the remote file server node was deleted (C5).

In addition, there may be several actions taken at the client node (R1–R5) for each file, such as a client node changes the file data, moves it to another directory and deletes the original directory. Even though several actions are being taken, the general rule applies which is that the files at the remote file server node are taken as correct. At the client node, the file is only presumed correct if it does not conflict with the remote file server copy. If there is a conflict that cannot be rectified, it is moved to the conflict bin of the client node.

Consider the scenarios where, while the client node was out of communication with the remote file server node, no changes were made to the (master) copy of the file at the remote file server node (column C1). In the simplest case, the client node also makes no changes to the file (R1, C1). In such a case, no action is taken by either the remote file server node or the client node. If the client node made a change to the contents of the file data, i.e., modified or wrote to the file (R2, C1), the modifications (or the entire modified file) are uploaded from the client node to the remote file server node using the upload process described above. The remote file server node saves this modified file data. On the other hand, if the client node renames the file or moves it to another directory (R3, C1), the remote file server node performs the same renaming or movement action on the (master) copy of the file maintained at the remote file server node. Likewise, if the client node deletes the file (R4, C1) or the entire directory containing the file (R5, C1), the remote file server node deletes the (master) copy of the file maintained at the remote file server node.

Consider now the situation where, while the client node was out of communication with the remote file server node, the copy of the file data at the remote file server node was changed, i.e., modified or written to (C2), e.g., by another client node. If the client node did not change its local copy of the file while out of communication with the remote file server node (R1, C2), then the client node simply invalidates the local copy of the file. Likewise, if the client node changed its local copy of the file data (R2, C2), the local copy of the file data is invalidated. In addition, the client node's local copy of the file data is moved to a local directory physically stored at the client node (e.g., on the client node's disk memory 15) called the "conflict bin." The conflict bin is a directory (of the disk memory 15) at the client node in which the client node places information or file data indicative of unresolvable conflicts. This enables the client node user to examine such information or file data at its leisure and resolve conflicts in it. In any of the cases where the client node renamed/moved its local copy of the file (R3, C2), deleted its local copy of the file (R4, C2) or deleted the entire directory containing the file (R5, C2), the modified (master) copy of the file at the server is downloaded to the client node and placed in the conflict bin.

Consider now the situation where, while the client node was out of communication with the remote file server node, the (master) copy of the file at the remote file server node is renamed or moved (C3), e.g., by another client node. If the client node did not change its local copy of the file data (R1, C3), then the client node performs the corresponding renaming or movement actions on its local copy of the file containing the unchanged file data. On the other hand, if the client node changed the file data, i.e., modified the file data or write to the file data (R2, C3), then the client's local copy of the file data is moved to the conflict bin. In addition, the modifications to the file data (or entire file) are uploaded to the remote file server node. The remote file server node stores the modified file data (or entire modified file) under the new name or moved location of the file. If the client node changed the name of the file or moved it (R3, C3) differently than was done to the (master) copy of the file at the remote file server node, then the client node places a warning message in the conflict bin indicating that the client node's renaming or movement was not performed for the file. If the client node deleted the file (R4, C3), the deletion operation is not performed at the remote file server node. Rather, the client node places a warning in the conflict bin indicating that the delete operation was not performed. If the client node deleted the directory containing the file (R5, C3), the file data (or entire file) is downloaded to the client node and placed in the conflict bin.

Consider now the scenarios where, while the client node is out of communication with the remote file server node, the (master) copy of the file at the remote file server node was deleted (C4), e.g., by another client node. Consider also the scenarios where, while the client node is out of communication with the remote file server node, the entire directory containing the (master) copy of the file at the remote file server node was deleted (C5), e.g., by another client node. Both of these scenario classes have the same impact on the file itself. Specifically, both are acts which delete the (master) copy of the file at the remote file server node. (The impact on reconciling the directories is different as will be described below.) These two scenarios are therefore described together.

If the client node did not change, i.e., modify or write to, its local copy of the file data (R1, C4 or R1, C5), the client node simply deletes or invalidates its local copy of the file data. If the client node had changed, i.e., modified or written to, its local copy of the file data (R2, C4 or R2, C5), the client node moves its local copy of the file data (or entire file) to the conflict bin. Likewise, if the client node had renamed or moved the file (R3, C4 or R3, C5), then the client node moves its local copy of the file data (or entire file) to the conflict bin. In addition, in any of scenarios R2, C4; R2, C5; R3, C4; or R3, C5, the client node uploads the file to the remote file server node which stores the uploaded copy under the new name or moved directory location. In any of the scenarios where the client node deleted the file (R4, C4 or R4, C5) or deleted the entire directory containing the file (R5, C4 or R5, C5), no action need be taken as there is nothing to reconcile.

FIG. 12 contains a chart summarizing the reconciliation actions taken by the remote file server node and the client node in regard to reconciling changes that affect directories. For convenience, each cell of the chart is labeled with a row number R1', R2', R3', R4' and R5' and a column number C1', C2', C3', C4' and C5'. The rows R1'–R5' contain cells indicating the actions taken when the client node: makes no changes to the directory (R1'); changes, i.e., modifies, a directory attribute (e.g., the privileges of one or more users or groups of users) (R2'); adds a file or child/subdirectory to a directory (R3'); renames or moves a directory (R4'); or deletes a directory (R5'). The columns contain cells indicating actions taken when: no changes were made to the directory at the remote file server node (C1'); the copy of the directory attributes at the remote file server node changed (C2'); a file or child/subdirectory was added to the copy of the directory at the remote file server node (C3'); the copy of the directory at the remote file server node was renamed or moved (C4'); or the copy of the directory at the remote file server node was deleted (C5').

Consider the scenario where, while the client node was out of communication with the remote file server node, the (master) copy of the directory was not changed/modified at the remote file server node (C1'). In the simplest case, the client node also has not changed/modified the directory (R1', C1') in which case no action is needed. If the client node: changed/modified one or more attributes of the directory (R2', C1'); or added one or more new files and/or child/subdirectories to the directory (R3', C1'); then the respective attribute modifications, e.g., changed attributes; or new file and/or child/subdirectory entries; are uploaded to the remote file server node. In response, the remote file server node makes the corresponding attribute modifications or adds the corresponding new file and/or child/subdirectory entries, to the respective attribute in the (master) copy of the directory stored at the remote file server node. If the client node deleted the directory (R5', C1'), then the remote file server node deletes its (master) copy of the directory.

Consider now the scenario where, while the client node was out of communication with the remote file server node, an attribute of the (master) copy of the directory at the remote file server node was changed/modified (C2'), e.g., by another client node. In the simplest case, the client node did not change/modify its local copy of the directory information (R1', C2') in which case modifications to the (master) copy of the directory information at the remote file server is downloaded to the client node and the client node stores/makes the same modifications to its local copy of the directory information. If the client node also changed/modified its local copy of the directory (R2', C2') then, the client node places a warning in its conflict bin advising that the directory at the remote file server node was modified while the remote file server node was out of communication with the client node in a fashion which was incompatible with a change/modification made by the client node under the same period of time. Suppose that the client node adds one or more files or child/subdirectories to the directory (R3', C2'). Such additions may be either compatible or incompatible with the attribute changes/modification made to the (master) copy of the directory information. An example of incompatibility is where the attributes of the (master) copy of the directory information are changed to make the directory read only for at least the user of the client node. This would prohibit any modifications to the directory or its contents by the client node, including prohibiting the addition of new files or child/subdirectories. If the client node additions are compatible, they are uploaded from the client node to the remote file server node and stored in the directory. Furthermore, if compatible with the privilege access rights of the client node user as now dictated by the modified attributes, the attribute modifications are downloaded to the client node and stored locally. Otherwise, each incompatible newly added file and child/directory entry is moved to the conflict bin. Lastly, if the client node renames or moves the directory (R4', C2') or deletes the directory (R5', C2'), the corresponding renaming/movement or deletion operation is also performed at the remote file server node.

Consider now the situation where, while the client node was out of communication with the remote file server node, one or more files and/or child/subdirectories are added to the (master) copy of the directory at the remote file server (C3'), e.g., by another client node. If the client node made no changes/modifications to the directory (R1', C3'), then the added file and child/subdirectory entries are downloaded from the remote file server node to the client node. If the client node changed/modified one or more attributes of the directory (R2', C3'), the added file and child/subdirectory entries are nevertheless downloaded from the remote file server node to the client node where they are stored locally. If the client node also added files or child/subdirectories (R3', C3'), a determination is first made to see if any are incompatible with the added files or child subdirectories at the remote file server node. An example of an incompatible entry is where both the client node and the remote file server node both attempted to add a file or child/subdirectory having the same name. If the additions made by the client node are compatible with the additions made at the remote file server node then the file and child/subdirectory entries made by the client node are uploaded to the remote file server node where they are stored and the file and child/subdirectory entries made by the remote file server node are downloaded to the client node where they are stored locally. On the other hand, the client node moves each of the client node's file or child/subdirectory entries, which are incompatible with the file or child/subdirectory entries made at the remote file server node, to the conflict bin. If the client node renamed or moved the directory (R4', C3') then the remote file server node correspondingly renames or moves the directory. In addition, the new file and child/subdirectory entries are downloaded from the remote file server node to the client node. If the client node deleted the directory (R5', C3'), the new files and directories are downloaded from the remote file server to the client node and the client node places them in the conflict bin. The remote file server node then deletes the (master) copy of the directory at the remote file server node.

Consider now the scenarios where, while the client node was out of communication with the remote file server node, the (master) copy of the directory at the remote file server node is renamed or moved (C4'), e.g., by another client node. If the client node made no changes/modifications to its local copy of the directory (R1', C4') then the client node correspondingly renames or moves its local copy of the directory in conformity with the remote file server node. If the client node change one or more attributes of the directory (R2', C4') then the client node nevertheless correspondingly renames or moves its local copy of the directory in conformity with the remote file server node. However, the client node also uploads the attribute changes to the remote file server node which stores them. In a similar fashion, if the client node added one or more new files or child/subdirectories (R3', C4') then the client node nevertheless correspondingly renames or moves its local copy of the directory in conformity with the remote file server node. However, the client node also uploads the new file and child/subdirectory entries to the remote file server node which stores them. If the client node renamed or moved the directory (R4', C4'), a determination is first made to see if the client node performed an identical renaming and/or moving operation. If so, no action is taken. Otherwise, the client node places a warning in the conflict bin indicating that the move or rename operation at the client node could not be effected at the remote file server node. If the client node deleted the directory (R5', C4') then the client node places a warning in the conflict bin indicating that the delete operation could not be performed at the remote file server node. In addition, the client node downloads from the remote file sever node a copy of the directory and stores it locally.

Consider now the scenarios where, while the client node is out of communication with the remote file server node, the (master) copy of the directory at the remote file server node is deleted (C5'), e.g., by another client node. If the client node made no changes to the directory (R1', C5') or only changed one or more attributes of the directory (R2', C5') then the client node simply deletes the directory. If the client node added one or more new files or child/subdirectories to the directory (R3', C5') then the client node moves the new files and child/subdirectory entries to the conflict bin. The client node also deletes the locally stored copy of the directory. If the client node moved or renamed the directory (R4', C5') then the client node stores a warning in the conflict bin indicating that the directory had been previously deleted at the remote file server node. In addition, the directory is uploaded from the client node to the remote file server node. Lastly, if the client node also deletes the directory (R5', C5') then no action is performed.

Distributed Access Control

As noted above, prior to enabling client nodes to access directories or file data (most notably, transmitting to client nodes copies of directory entries and file data for reading or writing, or storing modified directory entries and file data received from client nodes), the remote file server nodes perform two access checks on file data and directory entries. Specifically, the remote file server nodes check to make sure that the client node requesting the access operation has sufficient access privilege rights to perform the requested file data or directory access. In addition, the remote file server node also checks to make sure that the requested access adheres to explicit and implicit file sharing modes specified by the native file application programming interfaces for the respective files. These kinds of checks can be very time consuming. Moreover, the checks can be difficult to perform if multiple remote file servers are available for providing the accesses to a given file or directory on behalf of different nodes. According to this embodiment, the duties associated with access control, that is, both privilege rights access control and file sharing mode access control are distributed to one or more nodes, called access control nodes, other than the remote file server nodes which provide the data.

Figure 13:
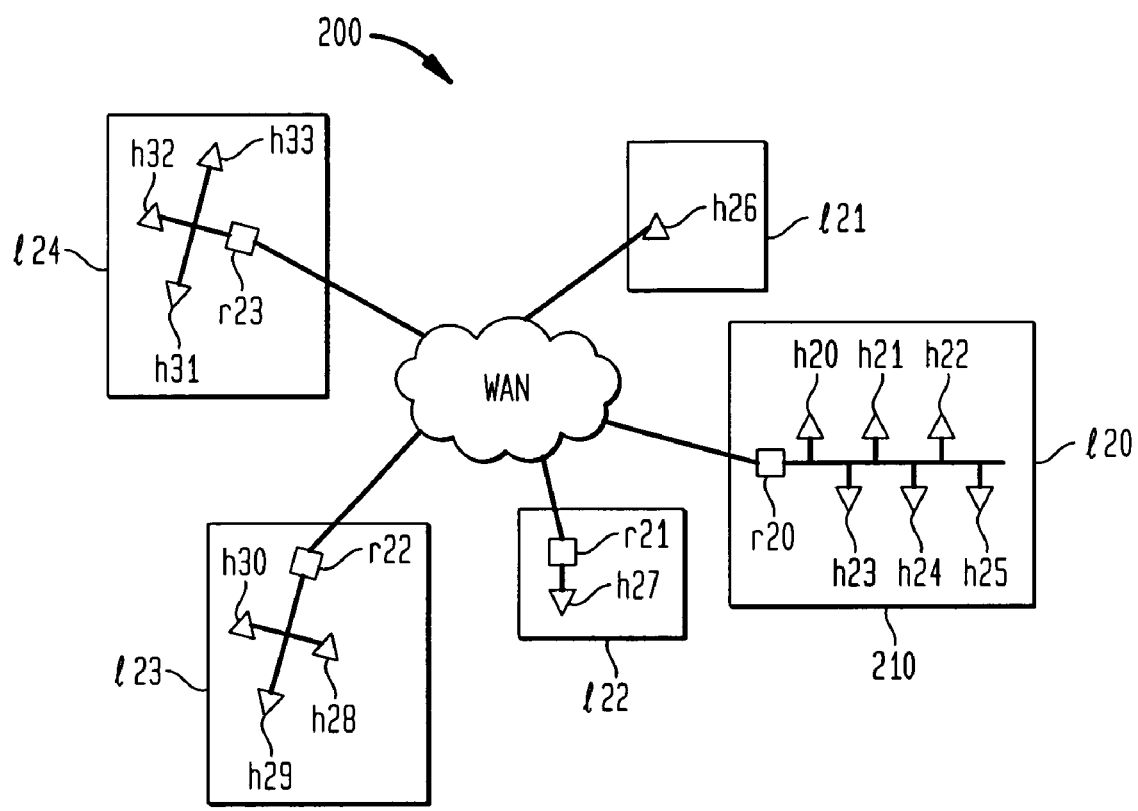
FIG. 13 shows an illustrative environment of use of another embodiment of the present invention.

FIG. 13 shows an illustrative environment in which this embodiment of the invention can be used, namely, a wide area network 200, such as the Internet. As before, h20–h32 denote computer terminals and r20–r23 denote routers or switches. More specifically, computer terminals h20–h25 denote client nodes on a local area network, which, with router r20, form subnetwork 120. Computer terminal h26 denotes a mobile client node forming subnetwork 121. Computer terminals h27 is an access control node, which, with router r21, form subnetwork 122. Computer terminals h28–h30 are remote file server nodes, which, with switch r22, form subnetwork 123. Computer terminals h31–h33 are remote file server nodes, which, with switch r23, form subnetwork 124. Illustratively, subnetworks 122–124 contain remote file server nodes operated by the same virtual file service provider (although the subnetworks, themselves, can be owned by an independent access provider or ISP). Illustratively, all of the client nodes h20–h26 are operated by client users who are part of the same group who have access to a particular virtual storage device. In addition, illustratively, this virtual storage device is accessible through any of the remote file server nodes h28–h33. Furthermore, assume that access control to at least one particular file is delegated to access control node h27. For purposes of this discussion, the steps associated with version control are omitted but nevertheless are performed either before or after the below described access control steps.

Figure 14A:
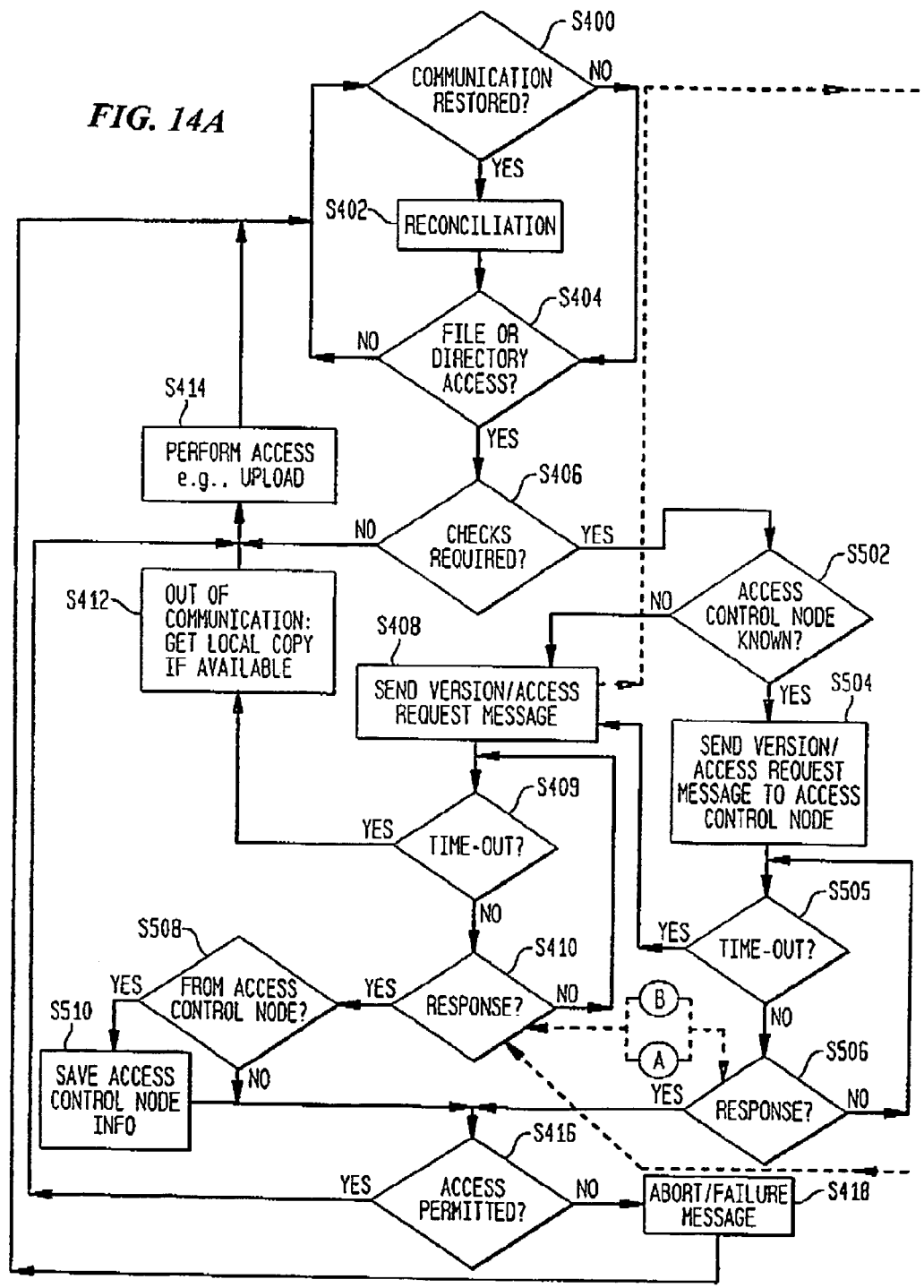
FIGS. 14A and 14B show a flowchart illustrating distributed access control according to an embodiment of the present invention.
Figure 14B:
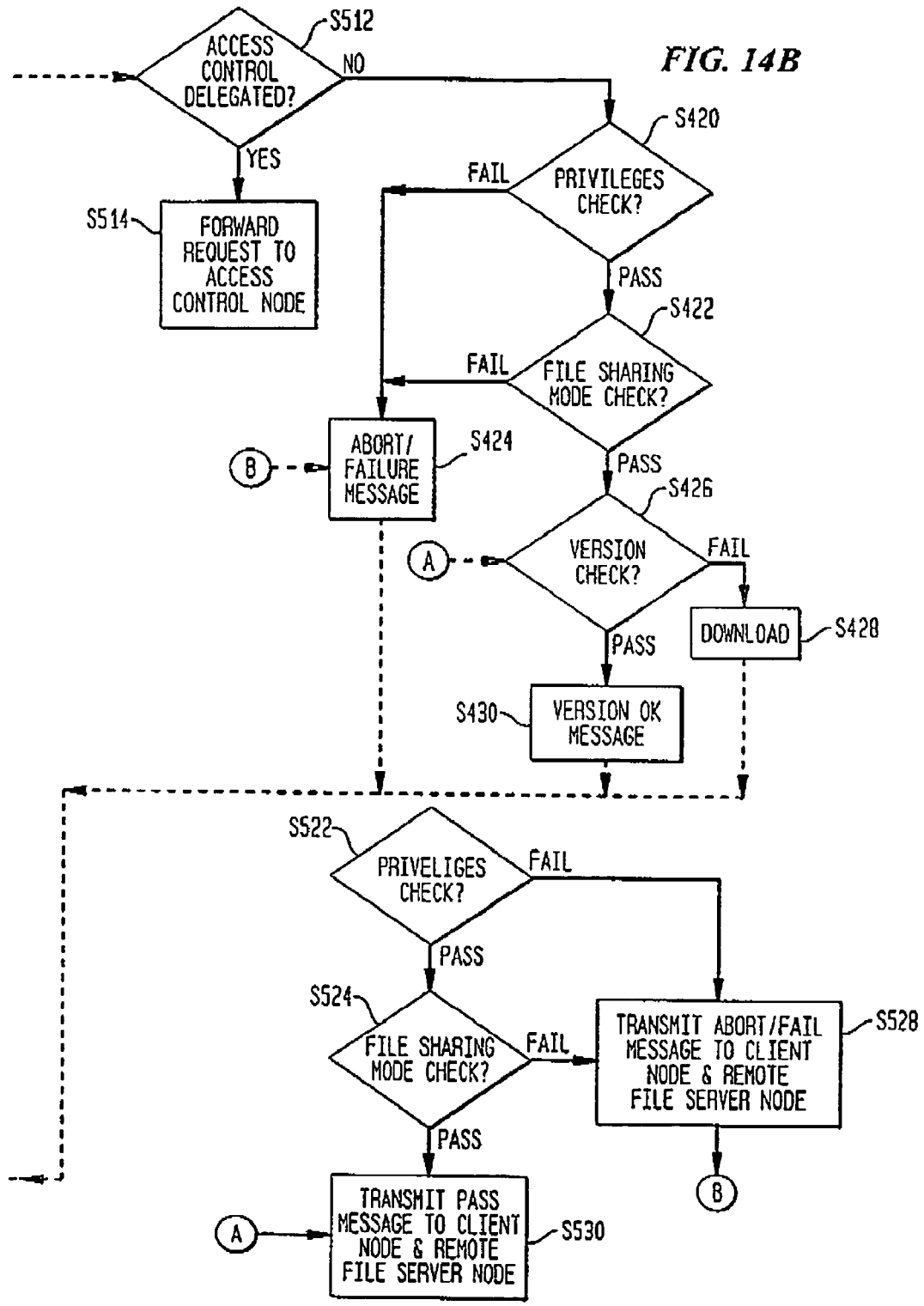

FIGS. 14A and 14B (referred to hereinbelow collectively as FIG. 14) illustrate a process carried out according to this embodiment of the invention. FIG. 14 is similar to the process of FIG. 10. As such, only the differences between these two embodiments will be discussed in detail below.

Assume initially, that the client node h26 desires to access a particular file or directory for which access control has been delegated to the access control node h27. As such, the node performs steps S400, S402, S404 and S406. Assume that the client node determines that a version check is necessary in step S406. Assume also initially, that the delegation of the access control is not known initially at the client node h26. In step S502, the client node h26 first determines whether or not the client node knows of an access control node delegated to the file or directory to be accessed. If not, the client node h26 transmits to remote file server node h28 via the Internet a request to access the particular file as in step S408 and waits to receive a response in steps S409–S410. Assume that a response is received. Next, in step S508, the client node determines if the response was received from a node, other than the remote file server node h28, which identifies itself as the access control node (namely, the access control node h27). Advantageously, the client node h26 authenticates a connection with this other node before communicating with it. If so, the client node stores (e.g. in memory 12 or disk 15) an indication of the access control node h27 for the file or directory to be accessed in step S510. The client node h26 then performs the remaining steps S416, S412, S414, S418, etc.

Assume now that the client node h26 desires to access the same file or directory and requires a version check. On the next access to the file or directory, the client node h26 will determine that it knows the access control node for the respective file or directory in step S502. Thus, in step S504, the client node h26 transmits its request directly to the access control node h27 via the Internet. Illustratively, prior to actually transmitting the request, the client node h26 opens an authenticated connection with the access control node h27. Next, steps S505–S506 cause the client node h26 to wait until a time out timer expires or the condition of step S506 is satisfied. In step S506, the client node h26 determines whether or not a response was received. If not, it is possible that the access control node h27 is disabled or access control has been re-assigned to a different node. In such a case, the client node h26 sends its access request to the remote file server node h28 in step S408 as above. If a response is received, the client node h26 performs the remaining steps S416, S412, S414, S418, etc.

Consider now the processing at the remote file server node h28 in response to receiving a request from the client node h26 in step S408. At step S512, the remote file server node h28 initially determines whether or not access control has been delegated to another node for the file or directory for which access is requested. If not, the remote file server node h28 performs the steps S420, S422, S424, S426, S428 and S430 as necessary to check the privilege access rights and file sharing mode of the requested access as well as the version of the copy of the file or directory in the possession of the client node h26. In this case, however, the remote file server node h28 determines that access control has been delegated to another node, namely node h27. Thus, in step S514, the remote file server node h28 forwards via the Internet the request of the client node h26 to the access control node h27 to which access control for the particular file has been delegated.

If the remote file server node h28 detects that the access control node h27 has approved the access (message "A"), then the remote file server node h28 performs a version check on the file or directory to be accessed in step S426, S428 and S430 as described above. To perform the version check in step S426, the remote file server node h28 might need the actual request information, which may have been transmitted directly from the client node h26 to the access control node h27. The approval message transmitted by the access control node h27 to the remote file server node h28 illustratively provides sufficient information for performing the remaining steps.

On the other hand, it is possible that the access control node does not approve the requested access (message "B"). In such a case, the remote file server node h28 aborts the access in step S424.

Now consider the steps performed at the access control node h27. The request from the remote file server node h28 or client node h26 is received at the access control node h27. In steps S522 and S524, the access control node h27 determines if the requesting client node h26 has sufficient privilege access rights to perform the request and whether or not the requested access adheres to implicit and explicit file sharing modes specified by the native file application programming interface associated with the file. If either of these checks fail, the access control node h27 transmits via the Internet a message to both the remote file server node h28 and the client node h26 informing them that the requested access could not be performed and the particular check which failed in step S528 (message "B"). On the other hand, if the requested access passes both checks in steps S522 and S524, the access control node h27 transmits via the Internet a message to both the client node h26 and the remote file server node h28 approving the access in step S530 (message "A").

Distributed Version Control

As with access control, the steps associated with version control can be delegated to a node other than the remote file server nodes. The node to which version control is delegated is referred to as a version control node. Again, the reasons for doing so are for sake of reducing the burden on the remote file server nodes. As noted above, version control is important for purposes of maintaining integrity of the files by ensuring that each access to a file at the remote file server nodes is performed on the latest version of the file data.

The version control node can be the same node as the access control node or a different node. Also, different version control nodes can be delegated for different files, different virtual storage devices, etc. However, in some applications is may be advantageous to have the same node perform both version control and access control for the same files.

Figure 15A:
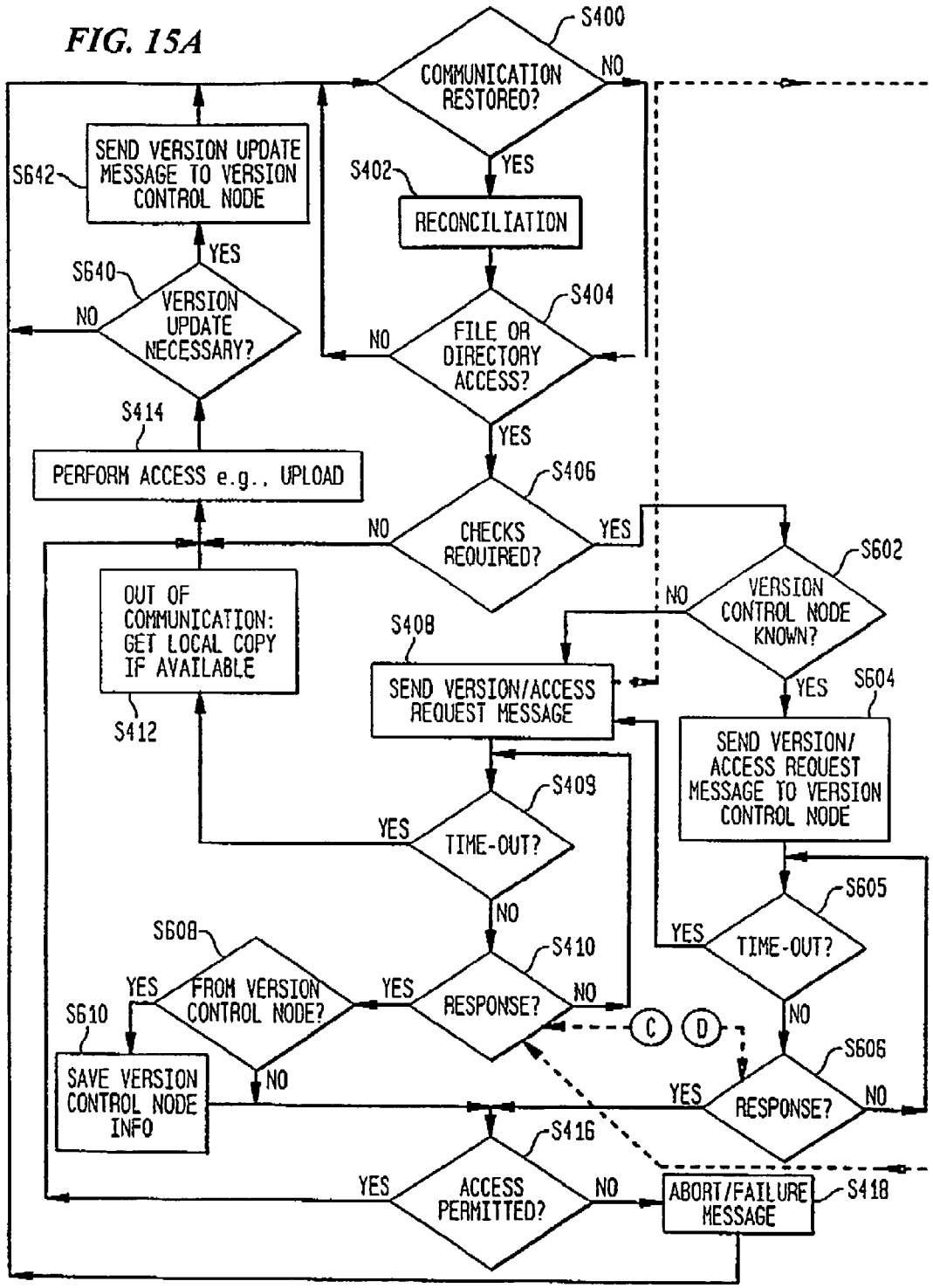

Consider the case where version control is performed at a version control node which does not also perform access control. For example, assume that node h26 is a client node, node h28 is the respective remote file server node and node h31 is the version control node. FIGS. 15A and 15B (referred to hereinafter collectively as FIG. 15) show a process which is a modification of the process shown in FIG. 10. As such, only the differences between the process of FIG. 10 and the process of FIG. 15 are described in detail.

Assume that the client node h26 desires to access a file or a directory under conditions requiring a version check. As such, the node performs steps S400, S402, S404 and S406. Assume also initially, that the delegation of the version control is not known initially at the client node h26. In step S602, the client node h26 first determines whether or not the client node knows of a version control node delegated to the file or directory to be accessed. If not, the client node h26 transmits to remote file server node h28 via the Internet a request to access the particular file in step S408 and waits to receive a response in steps S409–S410. Assume that a response is received. Next, in step S608, the client node determines if the response was received from a node, other than the remote file server node h28, which identifies itself as the version control node (namely, the version control node h31). Advantageously, the client node h26 authenticates a connection with this other node prior to communicating with it. If so, the client node h26 stores (e.g. in memory 12 or disk 15) an indication of the version control node h31 for the file or directory to be accessed in step S610. The client node h26 then performs the remaining steps S416, S412, S414, S418, etc.

Assume now that the client node h26 desires to access the same file or directory and requires a version check. On the next access to the file or directory, the client node h26 will determine that it knows the version control node for the respective file or directory in step S602. Thus, in step S604, the client node h26 transmits its request directly to the version control node h31 via the Internet. Illustratively, prior to actually transmitting the request, the client node h26 opens an authenticated connection with the version control node h31. Next, steps S605–S606 cause the client node h26 to wait until a time out timer expires or the condition of step S606 is satisfied. In step S606, the client node h26 determines whether or not a response was received. If not, it is possible that the version control node h27 is disabled or that version control has been re-assigned to a different node. In such a case, the client node h26 sends its access request to the remote file server node h28 in step S408 as above. If a response is received, the client node h26 performs the remaining steps S416, S412, S414, S418, etc.

Consider that it is possible for the client node h26 to access a file or a directory whether or not a version check is required. Such an access may result in the permanent/persistent modification of the (master) copy of the file or directory maintained at the remote file server node (i.e., via an upload process). If this happens, it is desirable for the client node to inform the version control node h31 that the version of the file or directory has changed. Thus, after executing step S414, the client node h26 determines if a version update is required for an accessed file of directory in step S640. If not (e.g., the access was only to a local cache copy, the access did not result in storage of modifications to the copy of the file or directory at the remote file server node or no separate version control node has been assigned to the updated file or directory), then the client node h26 skips to step S400. On the other hand, if the client node h26 did upload for storage at the remote file server node modifications to a file or directory, for which a version control node has been delegated, the client node h26 performs step S642.

In step S642, the client nod h26 transmits a version update message to the version control node h31.

Consider now the processing at the remote file server node h28 in response to receiving a request from the client node h26 in step S408. At step S612, the remote file server node h28 initially determines whether or not version control has been delegated to another node for the file or directory for which access is requested. If not, the remote file server node h28 performs the steps S420, S422 and S424 as necessary to check the privilege access rights and file sharing mode of the file or directory in the possession of the client node h26. In this case, however, the remote file server node h28 determines that version control has been delegated to another node, namely node h27. Thus, in step S614, the remote file server node h28 forwards via the Internet the request of the client node h26 to the version control node h31 to which version control for the particular file has been delegated.

If the remote file server node h28 detects that the version control node h27 has finished checking the version of the file or directory (messages "C" or "D"), then the remote file server node h28 performs the privilege access rights and file sharing mode checks in steps S420, S422 and S424 as described above.

After executing step S422, if the file or directory to be accessed is deemed to have passed the privilege access rights check and the file sharing mode check, the remote file server node h28 performs step S638. In step S638, the remote file server node h28 determines whether or not a version check has already been performed. If not, the remote file server node h28 performs step S426 as described above to determine if the client node h26 has the most up-to-date version of the file or directory to be accessed. If so, the remote file server node informs the client node h26 that the client has the most up-to-date version of the file or directory to be accessed (step S428) and, if not, the remote file server node h28 downloads the appropriate file data or directory information to the client node h26. In this case, however, the version check was performed by the version control node h31. Depending on whether the client node h26 has the most up-to-date version of the file or directory to be accessed (message "C") or requires downloading of the most up-to-date version of the file or directory to be accessed (message "D"), the remote file server node performs steps S430 or S428, respectively.

Now consider the steps performed at the version control node h31. The request from the remote file server node h28 or client node h26 is received at the version control node h31. In step S622 the version control node determines whether or not the request is simply a request to update the version number of a file or directory recently modified at the remote file server node h28. If so, the version control node h31 updates the version number associated with this file or directory in step S624. Alternatively, if the message is a request to check the version of a copy of a file or directory to be accessed at the client node h26, the version control node h31 performs step S626. In step S626, the version control node h31 determines if the requesting client node h26 has the most up-to-date version of the file or directory to be accessed. As noted above, this is achieved by determining if the version number supplied by the client node h26 matches the version number stored at the version control node as corresponding to the file or directory to be accessed. If the versions match (client node h26 has the most up-to-date copy), the version control node h31 transmits via the Internet a message "C" to both the client node h26 and the remote file server node h28 indicating that the client node has the most up-to-date version of the file or directory to be accessed. If the versions do not match (client node h26 has an outdated copy), the version control node h31 transmits via the Internet a message "D" indicating that the client node h26 has an outdated or stale copy of the file or directory (or, possibly, no copy of the file or directory) to be accessed.

In the case that both version and access control are implemented, the steps of both processes can be integrated. For instance, in FIG. 15, steps S512 and S514 can be inserted before step S612, such that step S612 is performed only if the "No" branch of step S512 is taken. Likewise, a combined access control-version control node can implement all of steps S522, S524, S528, S530, S622, S5624, S628 and S630. Such a node need only transmit the messages "B", "C" and "D", where messages "C" and "D" trigger the remote file server node to perform step S638. Also, a client node can be modified to contact an access control node, if one exists, and if the access is permitted, to contact a version control node, if one exists.

Finally, the above discussion is intended to be merely illustrative of the invention. Those skilled in the art may devise numerous alternative embodiments without departing from the spirit and scope of the following claims.

The invention claimed is:

1. A method for providing multi user file storage comprising the steps of:
   (a) enabling each user of a pre-subscribed user group of one or more users to connect an arbitrary client node at an arbitrary geographic location to a remote file server node via a wide area network,
   (b) enabling each user of the pre-subscribed user group to access files of a file group at the remote file server node via the respective client node connected to the remote file server node via the wide area network, including permitting, when the pre-subscribed user group includes at least two users, more than one user of the pre-subscribed user group to access the same file of the file group at the remote file server node simultaneously,
   (c) maintaining the integrity of the files at the remote file server node by controlling each access to each of the files at the remote file server node so that each access to each of the files at the remote file server node is performed, if at all, on a respective portion of the respective file as most recently updated at the remote file server node, wherein the respective portion is less than all of the respective file, thereby enabling all native operating system application programming interfaces to operate so that all multi-user applications accessing the files function as if the remote file server node, which stores the files, and client nodes, at which such multi-user applications execute, were on the same local area network, and
   (d) delegating both privileged rights access control and file sharing mode access control to a particular file of the group of files to one or more distributed nodes other than the remote file server node which provides the data.

2. The method of claim 1 further comprising the steps of:
   (e) requesting at a particular client node access to one of the files of the group of files, and
   (f) if the one file is the particular file, accessing the particular file at the particular client node only if permitted by the access control node.

3. The method of claim 2 further comprising the steps of:
   (g) issuing the request from the particular client node to the remote file server node, and
   (h) in response to determining that the one file is the particular file, forwarding the request to the access control node.

4. The method of claim 3 further comprising the step of:
   (i) in response to receiving at the particular client node a response from the access control node, issuing further messages pertaining to the access of the particular file directly from the particular client node to the access control node.

5. The method of claim 1 further comprising the step of:
   (e) delegating version control of the particular file to a version control node.

6. The method of claim 5 further comprising the steps of:
   (f) requesting, at a particular client node, for confirmation that at least a part of a particular copy of the particular file is the most updated version of the respective part of the particular copy of the file, and
   (g) accessing the part of the particular copy of the particular file only if permitted by the version control node.

7. The method of claim 6 wherein the particular client node stores the part of the particular copy in a storage device which is physically located locally to the particular client node.

8. The method of claim 6 further comprising the steps of:
   (h) issuing a request for confirming that at least a part of the particular file is the most updated version, from the particular client node to the remote file server node, and
   (i) in response to determining that the one file is the particular file, forwarding the message to the version control node.

9. The method of claim 8 further comprising the step of:
   (j) in response to receiving a response from the version control node at the particular client node, issuing further messages pertaining to version of the particular file directly from the particular client node to the version control node.

10. The method of claim 9 wherein in response to modifying the particular file, the particular client node issues to the version control node a version update message for the file indicating a recent update has occurred on the particular file.

11. The method of claim 5 wherein the version control node is also the access control node for the particular file.

12. The method of claim 1 further comprising the step of:
   (e) while a particular client node is in communication with the remote file server node, selectively downloading from the remote file server node to the particular client node via the wide area network a copy of at least a most recently updated portion of a particular file to be accessed by the particular client node and which the particular client node lacks, wherein at all times, each client node in communication with the remote file server node adheres to explicit and implicit file sharing modes specified by the native file application programming interfaces.

13. A method for providing multi user file storage comprising the steps of:
   (a) enabling each user of a pre subscribed user group of one or more users operating an arbitrary client node at an arbitrary geographic location to communicate with a remote file server node via a wide area network,
   (b) enabling each user of the pre subscribed user group to access files of a file group at the remote file server node via the respective client node in communication with the remote file server node via the wide area network, including permitting, when the pre-subscribed user group includes at least two users, more than one user of the pre subscribed user group to access the same file of the file group at the remote file server node simultaneously, (c) providing an interface for adapting file access at a particular client node by designating at the particular client node each accessible file of the file group as stored on a virtual storage device, and enabling access to the designated files in a fashion which is indistinguishable, by users of, and applications executing at, the particular client node, with access to one or more files stored on a physical storage device that is locally present at the particular client node, and (d) delegating both privileged rights access control and file sharing mode access control to a particular file of the group of files to one or more distributed nodes other than the remote file server node which provides the data, such that access to the particular file maintained at the remote file server node occurs on a most up to date version of the particular file.

14. The method of claim 13 further comprising the steps of:
(e) requesting at a particular client node access to one of the files of the group of files, and
(f) if the one file is the particular file, accessing the particular file at the particular client node only if permitted by the access control node.

15. The method of claim 14 further comprising the steps of:
(g) issuing the request from the particular client node to the remote file server node, and
(h) in response to determining that the one file is the particular file, forwarding the request to the access control node.

16. The method of claim 15 further comprising the step of:
(i) in response to receiving at the particular client node a response from the access control node, issuing further messages pertaining to the access of the particular file directly from the particular client node to the access control node.

17. The method of claim 13 further comprising the step of:
(e) delegating version control of the particular file to a version control node.

18. The method of claim 17 further comprising the steps of:
(f) requesting, at a particular client node, for confirmation that at least a part of a particular copy of the particular file is the most updated version of the respective part of the particular copy of the file, and
(g) accessing the part of the particular copy of the particular file only if permitted by the version control node.

19. The method of claim 18 wherein the particular client node stores the part of the particular copy in a storage device which is physically located locally to the particular client node.

20. The method of claim 18 further comprising the steps of:
(h) issuing a request for confirming that at least a part of the particular file is the most updated version, from the particular client node to the remote file server node, and
(i) in response to determining that the one file is the particular file, forwarding the message to the version control node.

21. The method of claim 20 further comprising the step of:
(j) in response to receiving a response from the version control node at the particular client node, issuing further messages pertaining to version of the particular file directly from the particular client node to the version control node.

22. The method of claim 21 wherein in response to modifying the particular file, the particular client node issues to the version control node a version update message for the file indicating a recent update has occurred on the particular file.

23. The method of claim 17 wherein the version control node is also the access control node for the particular file.

24. A method for providing multi user file storage comprising the steps of:
(a) enabling each user of a pre subscribed user group of one or more users operating an arbitrary client node at an arbitrary geographic location to communicate with a remote file server node via a wide area network,
(b) enabling each user of the pre subscribed user group to access files of a file group at the remote file server node via the respective client node in communication with the remote file server node via the wide area network, including permitting, when the pre-subscribed user group includes at least two users, more than one user of the pre subscribed user group to access the same file of the file group at the remote file server node simultaneously,
(c) transferring an encrypted key from the remote file server node to a particular client node via a secure channel, the encrypted key being encrypted using an encryption function not known locally at the remote file server node, the key being decryptable using a decryption function not known locally at the remote file server node, the decryption function being also not known locally at any other client node usable by others of the pre-subscribed user group,
(d) decrypting the transferred key at the particular client node,
(e) using the key at the particular client node to decrypt information of a file downloaded from the remote file server node or to encrypt information of a file prior to uploading for storage at the remote file server node, and
(f) delegating both privileged rights access control and file sharing mode access control to a particular file of the group of files to one or more distributed nodes other than the remote file server node which provides the data.

25. The method of claim 24 further comprising the steps of:
(g) requesting at a particular client node access to one of the files of the group of files, and
(h) if the one file is the particular file, accessing the particular file at the particular client node only if permitted by the access control node.

26. The method of claim 25 further comprising the steps of:
(i) issuing the request from the particular client node to the remote file server node, and
(j) in response to determining that the one file is the particular file, forwarding the request to the access control node.

27. The method of claim 25 further comprising the step of:
(k) in response to receiving at the particular client node a response from the access control node, issuing further messages pertaining to the access of the particular file directly from the particular client node to the access control node.

28. The method of claim 24 further comprising the step of:
(g) delegating version control of the particular file to a version control node.

29. The method of claim 28 further comprising the steps of:
(h) requesting, at a particular client node, for confirmation that at least a part of a particular copy of the particular file is the most updated version of the respective part of the particular copy of the file, and
(i) accessing the part of the particular copy of the particular file only if permitted by the version control node.

30. The method of claim 29 wherein the particular client node stores the part of the particular copy in a storage device which is physically located locally to the particular client node.

31. The method of claim 29 further comprising the steps of:
(j) issuing a request for confirming that at least a part of the particular file is the most updated version, from the particular client node to the remote file server node, and
(k) in response to determining that the one file is the particular file, forwarding the message to the version control node.

32. The method of claim 31 further comprising the step of:
(l) in response to receiving a response from the version control node at the particular client node, issuing further messages pertaining to version of the particular file directly from the particular client node to the version control node.

33. The method of claim 32 wherein in response to modifying the particular file, the particular client node issues to the version control node a version update message for the file indicating a recent update has occurred on the particular file.

34. The method of claim 28 wherein the version control node is also the access control node for the particular file.

35. A system for providing multi user file storage comprising the steps of:
a remote file server node for enabling each user of a pre subscribed user group of one or more users to connect an arbitrary client node at an arbitrary geographic location to communicate with said remote file server node via a wide area network,
a storage device at the remote file server node for enabling each user of the pre subscribed user group to access files of a file group at the remote file server node via the respective client node in communication with the remote file server node via the wide area network, including permitting, when the pre-subscribed user group includes at least two users, more than one user of the pre subscribed user group to access the same file of the file group at the remote file server node simultaneously, and
wherein the remote file server node is also for while enabling a plurality of the users to access the same file, concurrently maintaining the integrity of the files at the remote file server node by controlling each access to each of the files at the remote file server node so that each access to each of the files at the remote file server node is performed, if at all, on a respective portion of the respective file as most recently updated at the remote file server node, wherein the respective portion is less than all of the respective file, thereby enabling all native operating system application programming interfaces to operate so that all multi user applications accessing the files function as if the remote file server node, which stores the files, and client nodes, at which such multi user applications execute, were on the same local area network, and
wherein the remote file server node is also for delegating both privileged rights access control and file sharing mode access control to a particular file of the group of files to one or more distributed nodes other than the remote file server node which provides the data.

36. The system of claim 35 wherein a particular client node requests access to one of the files of the group of files, and wherein if the one file is the particular file, accessing the particular file at the particular client node only if permitted by the access control node.

37. The system of claim 36 wherein the particular client node issues the request to the remote file server node, and
wherein the remote file server node forwards the request to the access control node in response to determining that the one file is the particular file.

38. The system of claim 37 wherein the particular client node, in response to receiving a response from the access control node, issues further messages pertaining to the access of the particular file directly from the particular client node to the access control node.

39. The system of claim 35 wherein the remote file server node delegates version control of the particular file to a version control node.

40. The system of claim 39 wherein a particular client node requests confirmation that at least a part of a particular copy of the particular file is the most updated version of the respective part of the particular copy of the file, and
wherein the particular client node accesses the part of the particular copy of the particular file only if permitted by the version control node.

41. The system of claim 40 wherein the particular client node stores the part of the particular copy in a storage device which is physically located locally to the particular client node.

42. The system of claim 40 wherein the particular client node issues a request to the remote file server node to confirm that at least a part of the particular file is the most updated version, and
wherein the remote file server node, in response to determining that the one file is the particular file, forwards the message to the version control node.

43. The system of claim 42 wherein the particular client node, in response to receiving a response from the version control node, issues further messages pertaining to version of the particular file directly from the particular client node to the version control node.

44. The system of claim 43 wherein in response to modifying the particular file, the particular client node issues to the version control node a version update message for the file indicating a recent update has occurred on the particular file.

45. The system of claim 39 wherein the version control node is also the access control node for the particular file.

46. The system of claim 35 wherein the remote file server node is also configured for selectively downloading from the remote file server node to the particular client node via the wide area network a copy of at least a most recently updated portion of a particular file to be accessed by the particular client node and which the particular client node lacks, while a particular client node is in communication with the remote file server node, wherein at all times, each client node in communication with the remote file server node adheres to explicit and implicit file sharing modes specified by the native file application programming interfaces.

47. A system for providing multi user file storage comprising:
   a specific client node at an arbitrary geographic location, usable by a user of a pre subscribed user group for communicating with a remote file server node via a wide area network, the remote file server enabling each user of the pre subscribed user group to access files of a file group at the remote file server node via the respective client node in communication with the remote file server node via the wide area network, including permitting, when the pre-subscribed user group includes at least two users, more than one user of the pre subscribed user group to access the same file of the file group at the remote file server node simultaneously, and
   an interface for adapting file access at the specific client node by designating at the specific client node each accessible file of the file group as stored on a virtual storage device, and enabling access to the designated files in a fashion which is indistinguishable, by users of, and applications executing at, the specific client node, with access to one or more files stored on a physical storage device that is locally present at the specific client node, and
   wherein the remote file server node is also for delegating both privileged rights access control and file sharing mode access control to a particular file of the group of files to one or more distributed nodes other than the remote file server node which provides the data, such that access to the particular file maintained at the remote file server node occurs on a most up to date version of the particular file.

48. The system of claim 47 wherein a particular client node requests access to one of the files of the group of files, and
   wherein if the one file is the particular file, accessing the particular file at the particular client node only if permitted by the access control node.

49. The system of claim 48 wherein the particular client node issues the request to the remote file server node, and
   wherein the remote file server node forwards the request to the access control node in response to determining that the one file is the particular file.

50. The system of claim 49 wherein the particular client node, in response to receiving a response from the access control node, issues further messages pertaining to the access of the particular file directly from the particular client node to the access control node.

51. The system of claim 47 wherein the remote file server node delegates version control of the particular file to a version control node.

52. The system of claim 51 wherein a particular client node requests confirmation that at least a part of a particular copy of the particular file is the most updated version of the respective part of the particular copy of the file, and
   wherein the particular client node accesses the part of the particular copy of the particular file only if permitted by the version control node.

53. The system of claim 52 wherein the particular client node stores the part of the particular copy in a storage device which is physically located locally to the particular client node.

54. The system of claim 52 wherein the particular client node issues a request to the remote file server node to confirm that at least a part of the particular file is the most updated version, and
   wherein the remote file server node, in response to determining that the one file is the particular file, forwards the message to the version control node.

55. The system of claim 54 wherein the particular client node, in response to receiving a response from the version control node, issues further messages pertaining to version of the particular file directly from the particular client node to the version control node.

56. The system of claim 55 wherein in response to modifying the particular file, the particular client node issues to the version control node a version update message for the file indicating a recent update has occurred on the particular file.

57. The system of claim 56 wherein the version control node is also the access control node for the particular file.

58. A system for providing multi user file storage comprising:
   a remote file server node for enabling each user of a pre subscribed user group of one or more users operating an arbitrary client node at an arbitrary geographic location to communicate with a remote file server node via a wide area network,
   a storage device at the remote file server node for enabling each user of the pre subscribed user group to access files of a file group at the remote file server node via the respective client node in communication with the remote file server node via the wide area network, including permitting, when the pre-subscribed user group includes at least two users, more than one user of the pre subscribed user group to access the same file of the file group at the remote file server node simultaneously, and
   a particular client node,
   wherein the remote file server node is also configured for transferring an encrypted key from the remote file server node to a particular client node via a secure channel, the encrypted key being encrypted using an encryption function not known locally at the remote file server node, the key being decryptable using a decryption function not known locally at the remote file server node, the decryption function being also not known locally at any other client node usable by others of the pre subscribed user group,
   wherein the particular client node is also configured for decrypting the transferred key at the particular client node, and for using the key at the particular client node to decrypt information of a file downloaded from the remote file server node or to encrypt information of a file prior to uploading for storage at the remote file server node, and
   wherein the remote file server node is also for delegating both privileged rights access control and file sharing mode access control to a particular file of the group of files to one or more distributed nodes other than the remote file server node which provides the data.

59. The system of claim 58 wherein a particular client node requests access to one of the files of the group of files, and
   wherein if the one file is the particular file, accessing the particular file at the particular client node only if permitted by the access control node.

60. The system of claim 59 wherein the particular client node issues the request to the remote file server node, and
   wherein the remote file server node forwards the request to the access control node in response to determining that the one file is the particular file.

61. The system of claim 60 wherein the particular client node, in response to receiving a response from the access control node, issues further messages pertaining to the access of the particular file directly from the particular client node to the access control node.

62. The system of claim 58 wherein the remote file server node delegates version control of the particular file to a version control node.

63. The system of claim 62 wherein a particular client node requests confirmation that at least a part of a particular copy of the particular file is the most updated version of the respective part of the particular copy of the file, and wherein the particular client node accesses the part of the particular copy of the particular file only if permitted by the version control node.

64. The system of claim 63 wherein the particular client node stores the part of the particular copy in a storage device which is physically located locally to the particular client node.

65. The system of claim 63 wherein the particular client node issues a request to the remote file server node to confirm that at least a part of the particular file is the most updated version, and wherein the remote file server node, in response to determining that the one file is the particular file, forwards the message to the version control node.

66. The system of claim 65 wherein the particular client node, in response to receiving a response from the version control node, issues further messages pertaining to version of the particular file directly from the particular client node to the version control node.

67. The system of claim 66 wherein in response to modifying the particular file, the particular client node issues to the version control node a version update message for the file indicating a recent update has occurred on the particular file.

68. The system of claim 62 wherein the version control node is also the access control node for the particular file.

\* \* \* \* \*